US010960344B2

(12) United States Patent
Ishii et al.

(10) Patent No.: US 10,960,344 B2
(45) Date of Patent: Mar. 30, 2021

(54) METHOD AND APPARATUS FOR SEPARATING GAS BY PRESSURE SWING ADSORPTION

(71) Applicant: SEKISUI CHEMICAL CO., LTD., Osaka (JP)

(72) Inventors: Tetsuya Ishii, Ibaraki (JP); Yoji Fujimori, Ibaraki (JP); Kazumi Okada, Ibaraki (JP); Tomohiro Ootsuka, Ibaraki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 151 days.

(21) Appl. No.: 16/088,306

(22) PCT Filed: Mar. 27, 2017

(86) PCT No.: PCT/JP2017/012418
§ 371 (c)(1),
(2) Date: Sep. 25, 2018

(87) PCT Pub. No.: WO2017/170417
PCT Pub. Date: Oct. 5, 2017

(65) Prior Publication Data
US 2019/0111378 A1 Apr. 18, 2019

(30) Foreign Application Priority Data
Mar. 28, 2016 (JP) ............... JP2016-063913

(51) Int. Cl.
*B01D 53/00* (2006.01)
*B01D 53/053* (2006.01)
(Continued)

(52) U.S. Cl.
CPC ......... *B01D 53/053* (2013.01); *B01D 53/047* (2013.01); *B01D 53/62* (2013.01);
(Continued)

(58) Field of Classification Search
CPC .... B01D 53/047; B01D 53/053; B01D 53/62; B01D 53/72; B01D 53/84; B01D 53/864;
(Continued)

(56) References Cited

U.S. PATENT DOCUMENTS 4,421,530 A * 12/1983 Dalton, Jr. ........... B01D 53/047
423/219
4,452,612 A * 6/1984 Mattia .................... B01D 53/06
95/100

(Continued)

FOREIGN PATENT DOCUMENTS

EP 1 018 359 7/2000
EP 2 258 996 12/2010
(Continued)

OTHER PUBLICATIONS

Extended European Search Report dated Oct. 18, 2019 in corresponding European Patent Application No. 17774954.6.
(Continued)

*Primary Examiner* — Jonathan Miller
(74) *Attorney, Agent, or Firm* — Wenderoth, Lind & Ponack, L.L.P.

(57) ABSTRACT

It is an objective of the present invention to provide a gas separation method by which a removal performance to remove a removal object gas component and a recovery rate to recover a recovery object gas component can be satisfied at the same time, and furthermore, a generation efficiency of a product gas can be improved. A raw material gas g0 is fed to one adsorption vessel 11 of an adsorbing device 10 and a permeated gas g1 is sent out. A pressure of the other adsorption vessels 12 is made lower than a pressure during adsorption and a desorbed gas g2 is sent out. In accordance with an operating cycle of the adsorbing device 10 or according to a condition of the raw material gas g0 or the like, one of the permeated gas g1 and the desorbed gas g2
(Continued)

that has a lower concentration of a priority removal object gas component than the raw material gas g0 is provided as a return gas to the adsorbing device 10, the priority removal object gas component being a gas component to be preferentially removed.

19 Claims, 20 Drawing Sheets

(51) Int. Cl.
*B01D 53/047* (2006.01)
*B01D 53/62* (2006.01)
*B01D 53/72* (2006.01)
*B01D 53/84* (2006.01)
*B01D 53/86* (2006.01)

(52) U.S. Cl.
CPC .............. *B01D 53/72* (2013.01); *B01D 53/84* (2013.01); *B01D 53/864* (2013.01); *B01D 53/8671* (2013.01); B01D 2253/108 (2013.01); B01D 2256/16 (2013.01); B01D 2256/20 (2013.01); B01D 2256/24 (2013.01); B01D 2257/308 (2013.01); B01D 2257/408 (2013.01); B01D 2257/504 (2013.01); B01D 2257/7027 (2013.01); B01D 2258/0291 (2013.01); B01D 2259/40001 (2013.01); B01D 2259/402 (2013.01); B01D 2259/40009 (2013.01); B01D 2259/40054 (2013.01)

(58) Field of Classification Search
CPC .......... B01D 53/8671; B01D 2253/108; B01D 2256/16; B01D 2256/20; B01D 2256/24; B01D 2257/308; B01D 2257/408; B01D 2257/504; B01D 2257/7027; B01D 2258/0291; B01D 2259/40001; B01D 2259/40009; B01D 2259/40054; B01D 2259/402
See application file for complete search history.

(56) References Cited

U.S. PATENT DOCUMENTS

| | | | | |
|---|---|---|---|---|
| 4,732,577 A * | 3/1988 | Koizumi | ................ | C10K 1/32 95/101 |
| 5,042,994 A * | 8/1991 | Smolarek | ............ | B01D 53/047 95/1 |
| 5,993,517 A * | 11/1999 | Chen | ...................... | B01D 53/04 423/247 |
| 7,846,237 B2 * | 12/2010 | Wright | ............... | B01D 53/0462 95/11 |
| 8,128,737 B2 * | 3/2012 | Lomax, Jr. | ......... | B01D 53/1487 95/159 |
| 9,005,561 B2 * | 4/2015 | Leta | ..................... | B01D 53/526 423/228 |
| 9,808,755 B2 * | 11/2017 | Bhadra | ................ | B01D 53/047 |
| 2004/0216609 A1 * | 11/2004 | Baksh | ................. | C01B 23/0042 95/8 |
| 2009/0173226 A1 * | 7/2009 | Lomax, Jr. | ......... | B01D 53/1493 95/187 |
| 2012/0216609 A1 | 8/2012 | Amann et al. | | |
| 2012/0308456 A1 * | 12/2012 | Leta | ................... | B01J 20/28042 423/228 |
| 2013/0045517 A1 * | 2/2013 | Oakley | ..................... | C12P 7/54 435/139 |
| 2015/0152441 A1 * | 6/2015 | Schultz | ..................... | C12P 7/08 435/140 |
| 2017/0021301 A1 * | 1/2017 | Bhadra | ............... | C01B 17/0404 |
| 2018/0250626 A1 | 9/2018 | Fujimori et al. | | |
| 2018/0257034 A1 | 9/2018 | Fujimori et al. | | |

FOREIGN PATENT DOCUMENTS

| | | |
|---|---|---|
| EP | 2014-080328 | 5/2014 |
| JP | 2014-073477 | 4/2014 |
| JP | 2014-077060 | 5/2014 |
| JP | 2015-182927 | 10/2015 |
| WO | 2017/047730 | 3/2017 |
| WO | 2017/047731 | 3/2017 |

OTHER PUBLICATIONS

International Search Report dated May 30. 2017 in International (PCT) Application No. PCT/JP2017/012418.

International Preliminary Report on Patentability dated Oct. 11, 2018 in International (PCT) Application No. PCT/JP2017/012418.

Office Action dated Nov. 3, 2020, in corresponding Chinese Patent Application No. 201780021046.3, with English Machine translation.

* cited by examiner

METHOD AND APPARATUS FOR SEPARATING GAS BY PRESSURE SWING ADSORPTION

FIELD OF THE INVENTION

The present invention relates to a gas separation method and a gas separation apparatus for purifying a recovery object gas component and removing a removal object gas component from a raw material gas, and particularly relates to a gas separation method and a gas separation apparatus by pressure swing adsorption (PSA).

BACKGROUND OF THE INVENTION

Pressure swing adsorption is known as a method for purifying or removing a specific component from a raw material gas.

A method for obtaining a product gas from the raw material gas by pressure swing adsorption is generally classified into the following two:

(1) The raw material gas is fed to an adsorption vessel under high pressure, and thereby, a removal object gas component in the raw material gas is adsorbed. A recovery object gas component is allowed to permeate to be a product gas. Subsequently, the adsorption vessel is depressurized, and thereby, the adsorbed removal object gas component is desorbed to be exhausted. In this case, the permeated gas is a pure gas and the desorbed gas is an impure gas.

(2) The raw material gas is fed to the adsorption vessel under high pressure, and thereby, the recovery object gas component in the raw material gas is adsorbed. The removal object gas component is allowed to permeate to be exhausted. Subsequently, the adsorption vessel is depressurized, and thereby, the adsorbed recovery object gas component is desorbed to be the product gas. In this case, the desorbed gas is the pure gas and the permeated gas is the impure gas.

The "pure gas" used herein means a gas in which a concentration or a partial pressure of the recovery object gas component is higher than in the raw material gas and a concentrations or a partial pressures of the removal object gas component is lower than in the raw material gas.

The "impure gas" used herein means a gas in which the concentration or the partial pressure of the recovery object gas component is lower than in the raw material gas and the concentration or the partial pressure of the removal object gas component is higher than in the raw material gas.

A plurality of adsorption vessels are provided and while adsorption is conducted in one adsorption vessel, desorption is conducted in another adsorption vessel (Refer to Patent Document 1).

Patent Document 2 discloses a process in which a raw material gas such as a natural gas is modified to produce a synthetic gas and a hydrogen gas. A pressure swing adsorption system is disposed in a hydrogen production line. By the pressure swing adsorption system, hydrogen is refined from the fed gas and a remaining gas including carbon dioxide is exhausted. The remaining gas is returned to the raw material gas.

Patent Document 2 is silent about a cycle or timing for returning the remaining gas.

PRIOR ART DOCUMENTS

Patent Documents

Patent Document 1: Japanese Unexamined Patent Application Publication No, 2015-182927

Patent Document 2: Japanese Unexamined Patent Application Publication No. 2014-80328

SUMMARY OF THE INVENTION

Problem to be Solved by the Invention

A pressure swing adsorption system has an operation cycle and concentrations of gas components in a product gas vary in a cyclic manner. For example, in a case of the method (1) given above, there is a period in which a concentration of the removal object gas component in the permeated gas is relatively high. One way to secure a removal performance may be shortening a time interval for switching between the adsorption and desorption in the plurality of adsorption vessels. However, if the time interval is shortened, not a small amount of the recovery object gas component may be mixed in the desorbed gas, further in an exhaust gas, resulting in a declined recovery rate (an amount of the recovery object gas component in the product gas divided by an amount of the recovery object gas component in the raw material gas).

Moreover, a composition of the raw material gas can vary periodically (regularly) or at random. Therefore, for example, while when the partial pressure of the removal object component in the raw material gas is relatively high, mainly the removal object component may be adsorbed by an adsorbing device, when the partial pressure of the removal object component in the raw material gas is relatively low, the recovery object component can be adsorbed by the adsorbing device. In such a case, the recovery rate of the recovery object gas component will decline.

In view of the above, it is an objective of the present invention to provide a gas separation method and a gas separation apparatus that allow for a satisfactory removal performance to remove a removal object gas component and a satisfactory recovery rate to recover a recovery object gas component at the same time.

Means for Solving the Problems

To solve the problems mentioned above, the present invention provides a method for separating gas by pressure swing adsorption, the method including:

a step of adsorbing, wherein a raw material gas containing a removal object gas component and a recovery object gas component is fed to an adsorbing device and a permeated gas is sent out from the adsorbing device;

a step of desorbing, wherein a pressure of the adsorbing device is made lower than the pressure in the adsorbing step and a desorbed gas is sent out from the adsorbing device; and a step of returning, wherein one of the permeated gas and the desorbed gas is provided as a return gas to the adsorbing device in accordance with an operating cycle of the adsorbing device or according to a condition of the raw material gas, the permeated gas or the desorbed gas, said one gas having a lower concentration or a lower partial pressure of a priority removal object gas component than the raw material gas, the priority removal object gas component being a gas component to be preferentially removed among the removal object gas component.

In the adsorbing step, the adsorbing device selectively adsorbs an adsorption object gas component in the raw material gas. In the desorbing step, the adsorbing device desorbs the adsorbed adsorption object gas component. For example, when the adsorption object gas component is an object of removal, the permeated gas can be a product gas (method (1) given above). When the adsorption object gas component is an object of recovery, the desorbed gas can be a product gas (method (2) given above).

As mentioned above, the pressure swing adsorption method of this kind has an operating cycle and concentrations of gas components in the permeated gas or the desorbed gas to be the product gas vary. In accordance with the operating cycle, for example, the returning step is performed during a period in which the concentration of the priority removal object gas component in the permeated gas or the desorbed gas are relatively high. Execution of the returning step is not necessarily determined in accordance with the operating cycle. The execution of the returning step may be determined according to conditions of the raw material gas or the permeated gas or the desorbed gas.

Thereby, the concentration of the priority removal object gas component in the product gas can be prevented from being increased, and a removal performance can be secured. Moreover, it is not required to shorten a time interval for switching between the adsorption and the desorption more than necessary. Thereby, an increase in frequency of exhausting the recovery object gas component accompanying the switching can be avoided, and therefore, a reduction in a recovery rate of the recovery object gas component can be prevented. As a result, the removal performance and the recovery rate can be both satisfied. Moreover, by providing the gas having a low concentration or a low partial pressure of the priority removal object gas component as the return gas, an efficiency of generating the product gas can be enhanced.

The present invention provides a gas separation apparatus by pressure swing adsorption, the apparatus including:

an adsorbing device selectively adsorbing a removal object gas component or a recovery object gas component from a raw material gas and sending out a permeated gas:

a desorbing device making a desorbed gas containing the adsorbed object gas component sent out from the adsorbing device by making a pressure of the adsorbing device lower than when being fed and; and a returning device providing one of the permeated gas and the desorbed gas as a return gas to the adsorbing device in accordance with an operating cycle of the adsorbing device or according to a condition of the raw material gas, the permeated gas or the desorbed gas, said one gas having a lower concentration or a lower partial pressure of a priority removal object gas component than the raw material gas, the priority removal object gas component being a gas component to be preferentially removed among the removal object gas component.

Thereby, the removal performance to remove the priority removal object gas component can be secured and the reduction of the recovery rate of the recovery object gas component can be prevented. Moreover, the efficiency of generating the product gas can be enhanced.

The priority removal object gas component may include, for example, BTEX (benzene, toluene, ethyl benzene, xylene), a compound of nitrogen such as cyanogen or a compound of sulfur such as COS.

A non-priority removal object gas component that is not the priority removal object gas component may be $CO_2$, for example.

The recovery object gas component may be CO or $H_2$, for example.

Preferably, in the gas separation method, after a forwarding step is continuously performed for a predetermined first period of time, the returning step is continuously performed for a predetermined second period of time, wherein a returnable gas to be the return gas is forwarded instead of being returned in the forwarding step.

Preferably, the gas separation apparatus further includes a selector, the selector selecting between a forwarding mode and a returning mode, a returnable gas to be the return gas being provided as a forwarded gas instead of being returned in the forwarding mode, the returnable gas being provided as the return gas in the returning mode, wherein the selector switches to the returning mode after a predetermined first period of time has passed in the forwarding mode and the selector switches to the forwarding mode after a predetermined second period of time has passed in the returning mode.

Thereby, timing for switching modes can be time-managed. Since the concentrations of the gas components in the product gas vary generally periodically or generally regularly in the pressure swing adsorption method, the switching of modes can be performed by time management as mentioned above.

Preferably, in the gas separation method, a concentration or a partial pressure of one measurement object gas component or an indicator correlated to the concentration or the partial pressure is measured, the one measurement object gas component being a component of the permeated gas or the desorbed gas or the raw material gas, and based on the results of the measurement, a selection is made whether to execute the returning step or not.

Preferably, the gas separation apparatus further includes a measuring instrument, the measuring instrument measuring a concentration or a partial pressure of one measurement object gas component or an indicator correlated to the concentration or the partial pressure, the one measurement object gas component being a component of the permeated gas or the desorbed gas or the raw material gas, wherein a selection is made whether to execute the returning or not based on the results of the measurement.

Thereby, the modes can be switched according to an actual change in the concentration or the partial pressure of the one gas component. While it is preferred that the one gas component is the removal object gas component, the one gas component may be the recovery object gas component.

The concentration or the partial pressure or the indicator correlated to them may be an amount of infrared absorption, for example.

Preferably, the measurement object gas component is a low adsorptive removal object gas component, of the removal object gas component, the low adsorptive removal object gas component having lower adsorptive property by the adsorbing device than the priority removal object gas component.

Thereby, the returning step can be performed at timing when the concentration of the low adsorptive removal object gas component in the gas released from the adsorbing device in the adsorbing step starts to increase and the concentration of the priority removal object gas component has not yet started to increase. Therefore, the concentration of the priority removal object gas component in the product gas can be surely reduced. The low adsorptive removal object gas component may be $CO_2$, for example. The priority removal object gas component may be BTEX such as benzene, for example.

The measurement object gas component may be the priority removal object gas component.

Preferably, in the gas separation method, a returnable gas to be the return gas is passed through a delay path, the gas passing through the delay path taking a delay time according to a processing time from a start of the measurement to the selection, and the gas from the delay path is provided as the return gas in the returning step.

Preferably, the gas separation apparatus further includes a delay device including a delay path, the returnable gas to be the return gas passing through the delay path taking a delay time according to a processing time from a start of the measurement to the selection, wherein the returning device provides the gas from the delay device as the return gas.

Thereby, a time-lag between the measurement and the execution of returning can be compensated and contamination of the product gas by the removal object component or the like can be prevented or constrained.

Preferably, in the gas separation method, a gas portion that entered the delay path relatively earlier is flown out earlier than a gas portion that entered the delay path relatively later.

Preferably, in the gas separation apparatus, the delay device flows out a gas portion that entered the delay path relatively earlier than a gas portion that entered the delay path relatively later.

Thereby, the contamination by the removal object component or the like can be surely prevented or constrained.

Preferably, the gas separation method further includes an accumulating step, the return gas being accumulated in a return gas accumulator in the accumulating step.

Preferably, in the gas separation apparatus, the returning device includes a return gas accumulator, the return gas being accumulated in the return gas accumulator.

Thereby, the variation in concentrations and gas flow rates of the gas components of the return gas can be averaged. Moreover, the return gas can be returned to the raw material gas not only in the returning mode but also in the forwarding mode.

Preferably, the gas separation method further includes a reformulating step, a returnable gas to be the return gas being reformulated in the reformulating step before the returning step.

Preferably, the gas separation apparatus further includes a reformulating device reformulating the returnable gas to be the return gas before the execution of the returning.

Thereby, a concentration of a specific gas component of the return gas can be increased or decreased.

The reformulation mentioned in this document may result in a change in the concentration of the object gas component not only in the order of percentage, for example, but also in the order of ppm.

Preferably, the gas after the reformulation has a higher concentration or a higher partial pressure of $CO_2$ than the gas before the reformulation.

Preferably, in the gas separation method, the reformulating step includes a microbial fermentation step, the permeated gas being reformulated by microbial fermentation in the microbial fermentation step.

Preferably, in the gas separation apparatus, the reformulating device includes a culture vessel for microorganisms performing fermentation with the permeated gas.

Thereby, valuable materials such as ethanol can be produced during the reformulation. Moreover, an off-gas from the culture vessel can be used as the return gas. Usually, the off-gas of this kind is rich in $CO_2$. The off-gas from the culture vessel can be used as it is. Alternatively, the off-gas can be used after removing impurities therefrom.

Some kinds of microorganisms produce sulfide such as $H_2S$. Moreover, since the culturing is usually done in liquid, the gas from the culture vessel usually contains water contents. Since the sulfides and the water contents may provide adverse effects such as degrading a catalyst and an adsorbent or the like, it is preferable to remove the sulfide and the water by various removers such as a desulfurizing agent and an adsorbent.

Preferably, the gas after the reformulation has a higher concentration or a higher partial pressure of $CO_2$ than the gas before the reformulation.

In the gas separation method, the reformulating step may include a catalytic reaction step, the permeated gas being reformulated by catalytic reaction in the catalytic reaction step.

In the gas separation apparatus, the reformulating device may include a catalytic reactor, the catalytic reactor reformulating the permeated gas by catalytic reaction.

The reformulating device may include an activated carbon.

The reformulating device may include a desulfurizing agent.

The reformulating device may include a deoxidant.

Usually, the gas that can be provided as the return gas is the "pure gas" mentioned above.

On the other hand, even the "impure gas" can be made the gas having a lower concentration or partial pressure of the priority removal object gas component than the raw material gas by the reformulation, and then can be provided as the return gas.

Preferably, the gas separation method further includes a purging step, wherein the return gas is fed (returned) to the adsorbing device as a purge gas and a gas is pushed out of the adsorbing device in accordance with the operating cycle of the adsorbing device.

Preferably, the gas separation apparatus further includes a purging system pushing a gas out of the adsorbing device by feeding (returning) the return gas to the adsorbing device as a purge gas in accordance with the operating cycle of the adsorbing device.

Thereby, the recovery rate of the recovery object gas component can be further enhanced.

Preferably, in the gas separation method, the purge gas is a gas obtained by reformulating the permeated gas or the desorbed gas.

Preferably, in the gas separation apparatus, the purging system includes a reformulating device that reformulates the permeated gas or the desorbed gas to generate the purge gas.

Thereby, the permeated gas or the desorbed gas is reformulated, and then can be used as the purge gas. Even if the desorbed gas contains the priority removal object gas component, the concentration or the partial pressure of the priority removal object gas component in the purge gas can be reduced by performing a reformulating treatment to remove the priority removal object gas component with an activated carbon or the like.

The purge gas may be a gas that has a lower concentration or a lower partial pressure of the priority removal object gas component than the raw material gas by reformulating one of the desorbed gas and the permeated gas (impure gas) that has a higher concentration or a higher partial pressure of the priority removal object gas component than the raw material gas.

The purge gas may be a gas that has the lower concentration or the lower partial pressure of the priority removal object gas component than the raw material gas by making a gas (impure gas) that has a higher concentration or a higher partial pressure of the priority removal object gas component than the raw material gas contacted with an activated carbon.

Thereby, even the "impure gas" of the desorbed gas or the permeated gas can be purified and used as the purge gas. Since the purge gas is purified, damage to the recovery rate of the recovery object gas component and to the efficiency of generating the product gas can be prevented.

Preferably, the reformulating device of the purging system includes a culture vessel for microorganisms performing fermentation with the permeated gas, for example. Thereby, the off-gas from the culture vessel can be used as the purge gas.

The reformulating device of the purging system may include a catalytic reactor, the catalytic reactor reformulating the permeated gas by catalytic reaction.

Preferably, the purge gas is the permeated gas or the desorbed gas after at least one of processing steps of desulfurization and dehydration.

Preferably, a flow direction of the purge gas in the adsorbing device is same as a direction of a gas flow in the adsorbing step.

The flow direction of the purge gas in the adsorbing device may be opposite to the direction of the gas flow in the adsorbing step.

The purge gas may be introduced to the adsorbing device from a middle portion of the adsorbing device. In an earlier period of the purging step, an entirety of the adsorbing device may be purged with the purge gas. In a later period of the purging step, the purge gas may be introduced into the adsorbing device from a middle portion of the adsorbing device and a portion of the adsorbing device from the middle portion thereof to an outlet port in the adsorbing step may be purged.

In addition to the above, an off-gas (containing nitrogen as main component) from an apparatus that produces oxygen from the air and the off-gas having higher nitrogen purity may be used as the purge gas. A carbon dioxide gas produced by burning and detoxifying various kinds of off-gases and a gas containing nitrogen as main component or the like may also be used as the purge gas.

When an adsorbent is used for desulfurization and dehydration, it is preferable to refresh the adsorbent with a nitrogen gas or the forward gas as appropriate.

Preferably, a selection is made whether to provide the pushed-out gas as the return gas or not according to a concentration or a partial pressure of the priority removal object component in the pushed-out gas.

When the concentration or the partial pressure of the priority removal object gas component in the pushed-out gas is relatively low, the pushed-out gas may not be returned and provided as the forward gas. Thereby, the efficiency of generating the product gas can be enhanced.

More preferably, the concentration or the partial pressure of the priority removal object component in the pushed-out gas or an indicator correlated to the concentration or the partial pressure is measured and based on the result of the measurement a selection is made whether to provide the pushed-out gas as the return gas or not, and the pushed-out gas after the measurement is passed through a delay path, the gas passing through the delay path taking a delay time according to a processing time from a start of the measurement to the selection, and the gas from the delay path is provided as a returnable gas to be the return gas.

Thereby, the time-lag between the measurement and the execution of returning can be compensated and the concentration or the partial pressure of the removal object gas component in the product gas can be further reduced.

The pushed-out gas may be unconditionally provided as the return gas.

Advantageous Effects of the Invention

According to the present invention, reduction in the removal performance in the pressure swing adsorption method can be prevented and the reduction in the recovery rate can also be prevented. Furthermore, the efficiency of generating the product gas can be enhanced.

MODE FOR CARRYING OUT THE INVENTION

Embodiments of the present invention will be described hereinafter with reference to the drawings.

First Embodiment

Figure 1:
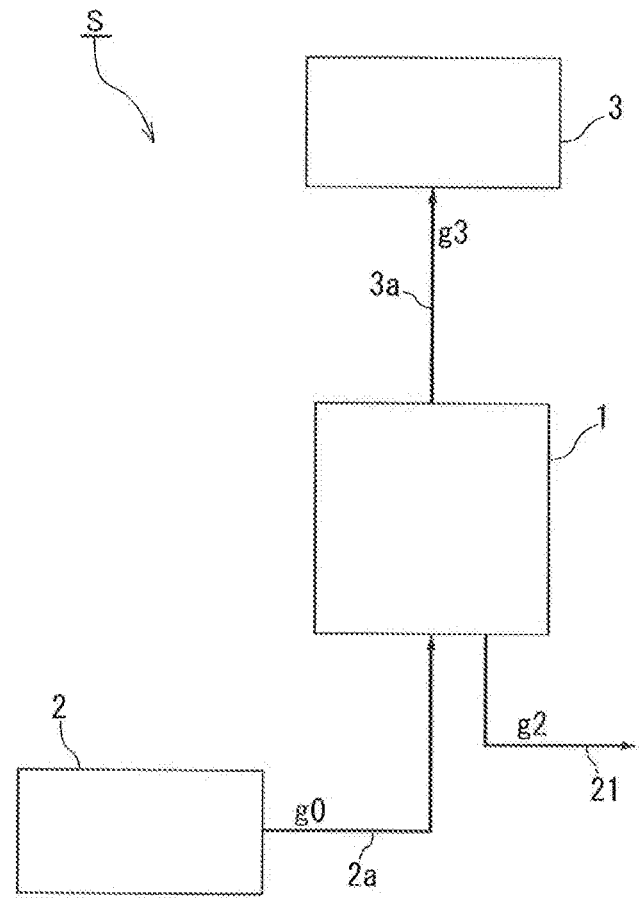
FIG. 1 is a circuit diagram showing a general outline of a mixed gas production and utilization system including a gas separation apparatus according to a first embodiment of the present invention.

FIGS. 1 to 6 show a first embodiment of the present invention. As shown in FIG. 1, a mixed gas production and utilization system S includes a gas separation apparatus 1, a raw material gas supplier 2 and a gas utilizing part 3. The raw material gas supplier 2 is a waste disposal facility. Wastes may include municipal wastes, tires, biomass, wooden chips, plastic wastes or the like. A melting furnace (waste incinerator) is provided in the waste disposal facility. The wastes are burned in the melting furnace by highly concentrated oxygen gas and dissolved to a low-molecular level. Finally, a syngas (synthetic gas) containing CO and $H_2$ are generated.

The syngas serves as a raw material gas g0 to the gas separation apparatus 1. In addition to CO and $H_2$, the raw material gas g0 includes $N_2$, $CO_2$, BTEX (benzene, toluene, ethyl benzene, xylene) or the like. $CO_2$ concentration in the raw material gas g0 is in the order of percentage, for example, and a concentration of $C_6H_6$ (benzene) in the raw material gas g0 is in the order of several thousands to several ppm, for example.

Of the components of the raw material gas g0, CO and $H_2$ are recovery object gas components to be recovered.

Of the components of the raw material gas g0, $CO_2$ and BTEX such as $C_6H_6$ are removal object gas components to be removed.

Of the removal object gas components, a priority removal object gas component to be preferentially removed is BTEX. The BTEX such as $C_6H_6$ gives adverse effects on culturing of microorganisms to be described later.

$CO_2$ is a non-priority removal object gas component given a lower priority in removal than BTEX.

The gas separation apparatus 1 is disposed between the raw material gas supplier 2 and the gas utilizing part 3. The raw material gas g0 is separated into a product gas g3 (forward gas) rich in the recovery object gas components and a desorbed gas g2 rich in the removal object gas components. The product gas g3 is a mixed gas containing CO and $H_2$ as main components. The product gas g3 is supplied to the gas utilizing part 3 and used for various purposes.

For example, the gas utilizing part 3 is a culture vessel. In the culture vessel, valuable materials such as ethanol are produced by fermentation by microorganisms.

The desorbed gas g2 is sent to a waste gas treatment part not shown in the drawings.

FIGS. 2 to 5 show the gas separation apparatus 1 in different operation modes.

Elements 2p, 11, 12, 22, 23, 31 of the gas separation apparatus 1 to be described later are connected by a plurality of pipes. Each of the pipes is provided with a valve. The gas separation apparatus 1 is selectively operated in one of the plurality of operations modes (FIGS. 2 to 5) by opening and closing of the pipes by a valve control by a controller (not shown). In the drawings, mainly opened pipes are schematically shown as gas paths 2a, 3a, 3b, 21, 41 per operation mode for the sake of simplification. Closed paths are basically omitted from the drawings. However, some of the closed paths may be shown in hollow lines as appropriate.

In the description given below, the gas separation apparatus 1 is in the operation mode shown in FIG. 2 unless mentioned otherwise.

Figure 2:
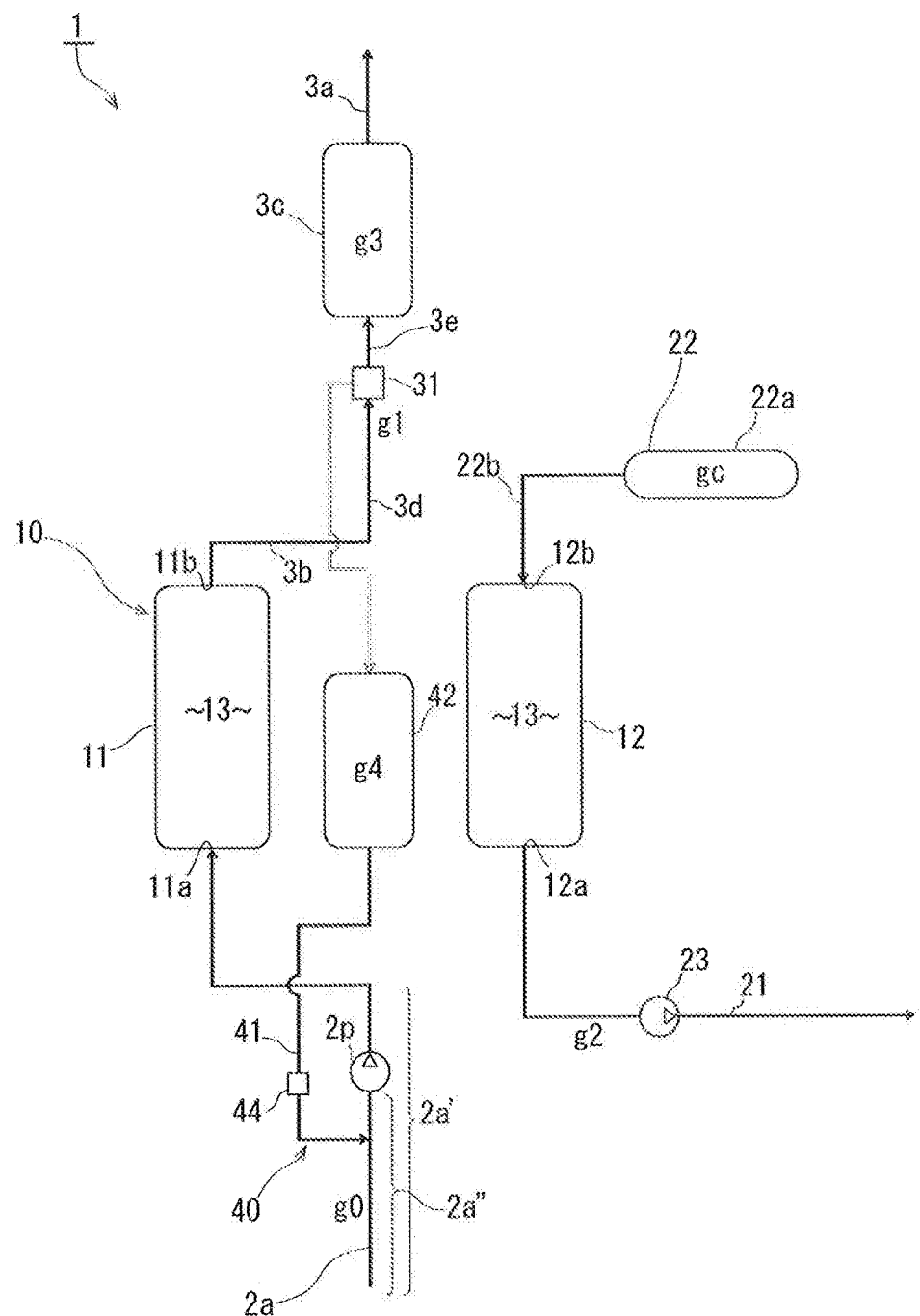
FIG. 2 is a circuit diagram of the gas separation apparatus in a forwarding mode in a first adsorbing-desorbing step.

As shown in FIG. 2, the gas separation apparatus 1 includes an adsorbing device 10. The adsorbing device 10 includes a first adsorption vessel 11 and a second adsorption vessel 12. An adsorbent 13 is received in each of the adsorption vessels 11, 12. Materials for the adsorbent 13 may include zeolite. The adsorbent 13 can selectively adsorb the removal object gas components ($C_6H_6$, $CO_2$, or the like) among the components of the raw material gas g0 under a relatively high pressure. The adsorbent 13 desorbs the adsorbed components ($CO_2$, $C_6H_6$, or the like) under a relatively low pressure.

To describe it more in detail, the adsorbent 13 such as zeolite is more prone to adsorb the removal object gas components ($C_6H_6$, $CO_2$, or the like) than the recovery object gas components (CO, $H_2$, or the like). The adsorbent 13 is particularly prone to adsorb BTEX such as $C_6H_6$ among the removal object gas components. Compared to BTEX, $CO_2$ is a low adsorptive removal object gas component having a low adsorptive property by the adsorbent 13. The adsorbent 13 is more prone to adsorb BTEX than $CO_2$, and $CO_2$ than CO.

Pressure conditions for the adsorbent 13 is not limited to higher than an atmospheric pressure during the adsorption and lower than the atmospheric pressure during the desorption. Alternatively, the adsorbent 13 may be under a pressure higher than the atmospheric pressure during the adsorption and under the atmospheric pressure during the desorption. Alternatively, the adsorbent 13 may be under the atmospheric pressure during the adsorption and under a pressure lower than the atmospheric pressure during the desorption.

As shown in FIG. 1, a raw material gas path 2a extends from the raw material gas supplier 2 to the gas separation apparatus 1. As shown in FIG. 2, the raw material gas path 2a is provided with a gas forwarding means 2p. The gas forwarding means 2p is a blower or a compressor.

Although not shown in the drawings, the raw material gas path 2a may be provided with a $H_2S$ adsorbent $H_2O$ adsorbent a $CO_2$ absorber and a BTEX absorber in a serial manner.

A downstream end of the raw material gas path 2a is connected to a first port 11a of the first adsorption vessel 11. A product gas buffer tank 3c is connected to a second port 11b of the first adsorption vessel 11 via a permeated gas path 3b, 3d, a switching device 31, and a forwarding path 3e in this order. The product gas g3 is stored in the buffer tank 3c.

As shown in FIGS. 1 and 2, the product gas path 3a extends from the buffer tank 3c to the gas utilizing part 3.

Figure 3:
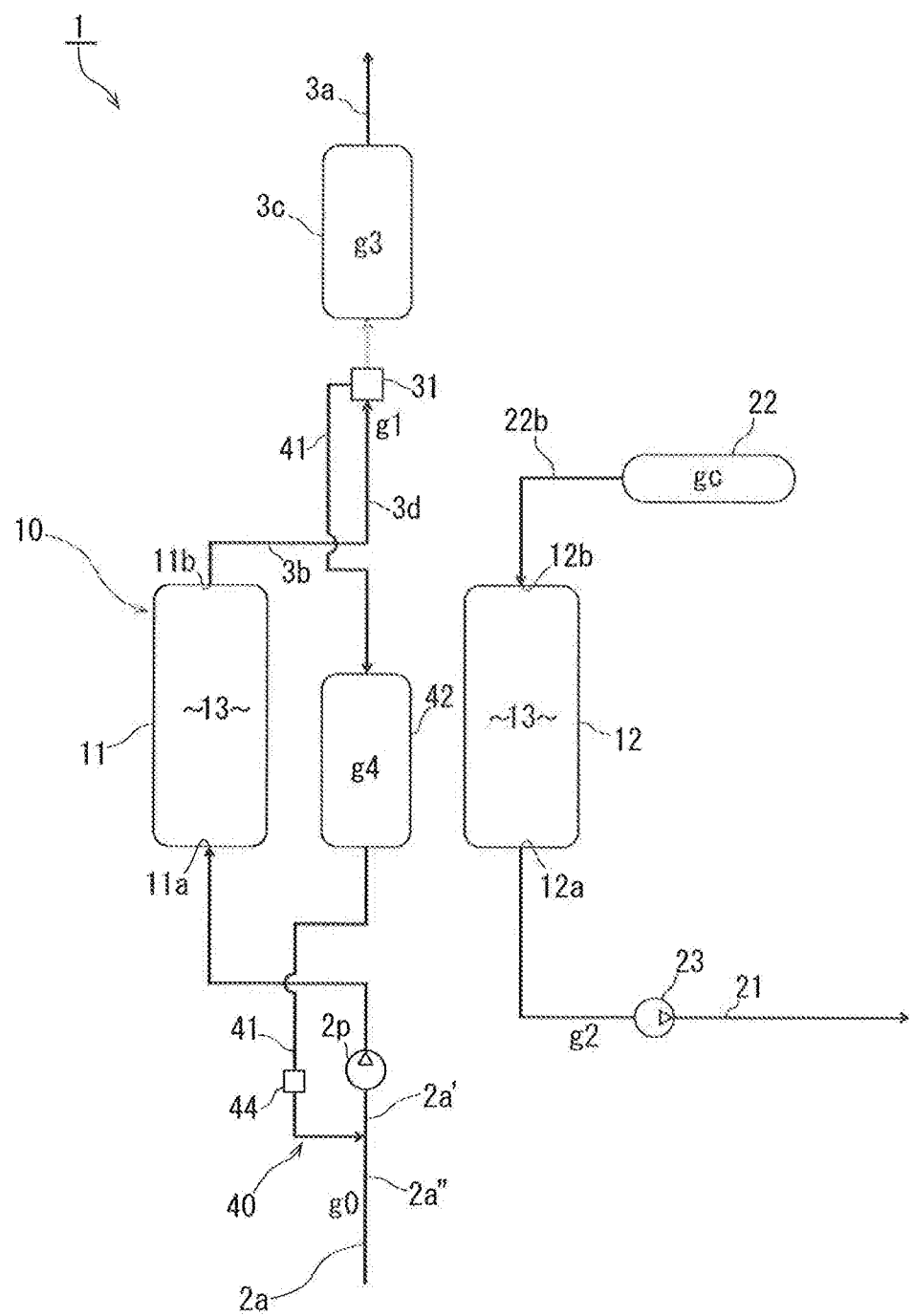
FIG. 3 is a circuit diagram of the gas separation apparatus in a returning mode in the first adsorbing-desorbing step.
Figure 4:
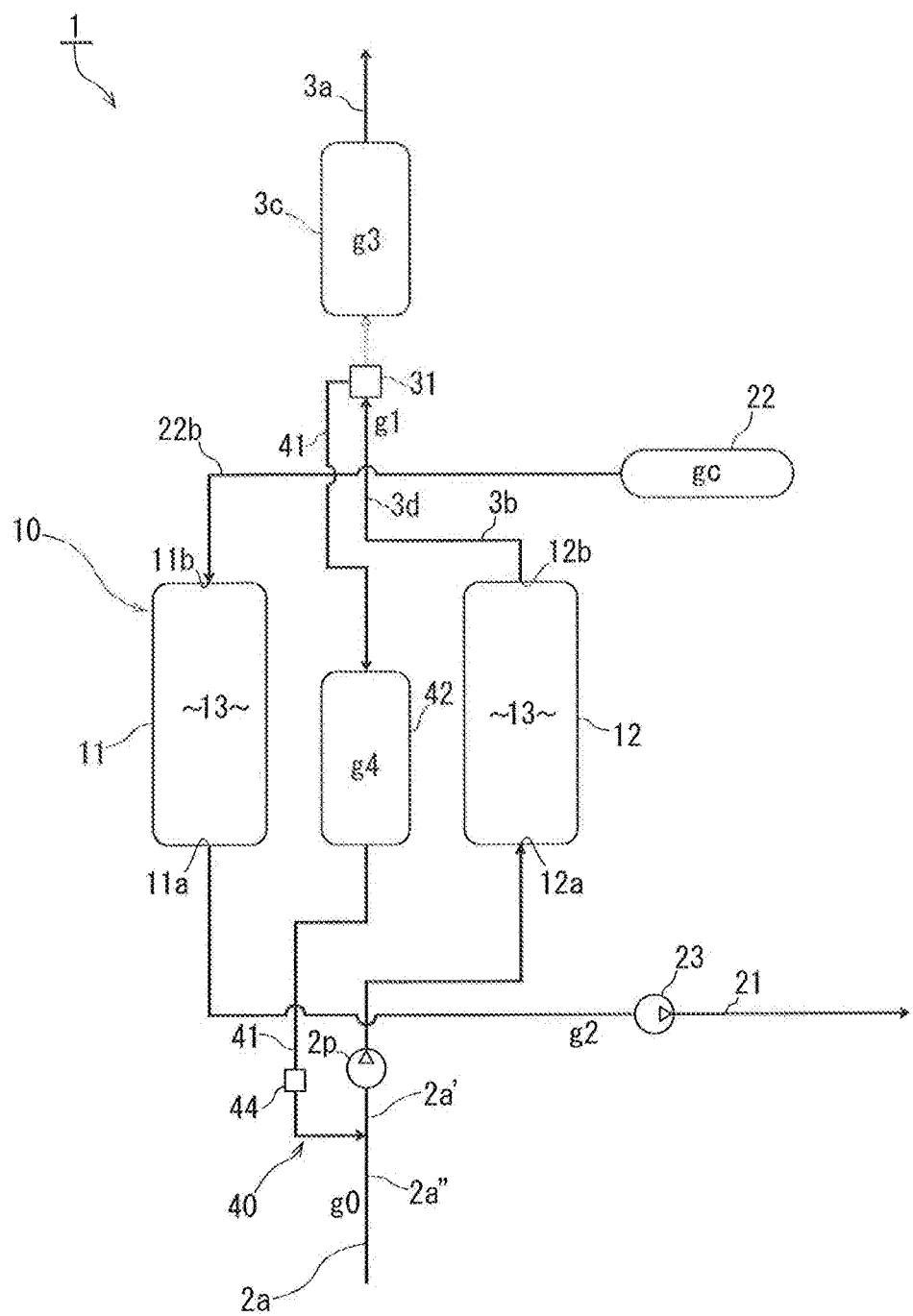
FIG. 4 is a circuit diagram of the gas separation apparatus in a returning mode in a second adsorbing-desorbing step.

As shown in FIG. 4, depending on the operation mode of the gas separation apparatus 1, the downstream end of the raw material gas path 2a is connected to a first port 12a of the second adsorption vessel 12 and an upstream end of the permeated gas path 3b is connected to a second port 12b of the second adsorption vessel 12. Although not shown in detail in the drawings, branch pipes branch from a common pipe constituting a common path portion 2a' of the raw material gas path 2a and extend to the first ports 11a, 12a of the adsorption vessels 11, 12. The gas forwarding means 2p is disposed in the common path portion 2a'. Pipes for the permeated gas path 3b (FIG. 2, FIG. 3) from the first adsorption vessel 11 and pipes for the permeated gas path 3b (FIG. 4, FIG. 5) from the second adsorption vessel 12 are joined to each other and continue to a pipe for the common permeated gas path 3d.

As shown in FIG. 2, the switching device 31 (selector) is disposed between the common permeated gas path 3d and the forwarding path 3e. The switching device 31 is a three-way valve, for example. The switching device 31 is controlled by the controller (not shown). One of a forwarding mode (forwarding step) and a returning mode (returning step) to be described later is selected by the switching device 31.

As shown in FIG. 2, a carrier gas supplying system 22 is connected to the second port 12b of the adsorption vessel 12. The carrier gas supplying system 22 includes a carrier gas source 22a and a carrier gas supply path 22b. A carrier gas gc may be nitrogen ($N_2$), for example. A desorbed gas path 21 extends from the first port 12a of the adsorption vessel 12. The desorbed gas path 21 is provided with a suctioning device 23. The suctioning device 23 is a blower or a vacuum pump or the like. The carrier gas supplying system 22 and the suctioning device 23 constitute a "desorbing device". One of the carrier gas supplying system 22 and the suctioning device 23 may be omitted. A portion of the desorbed gas path 21 on a downstream side with respect to the suctioning device 23 extends to the waste gas treatment part (not shown).

As shown in FIG. 4, depending on the operation mode of the gas separation apparatus 1, the carrier gas supplying system 22 is connected to the second port 11b of the first adsorption vessel 11 and an upstream end of the desorbed gas path 21 is connected to the first port 11a of the first adsorption vessel 11.

As shown in FIG. 2, the gas separation apparatus 1 is further provided with a returning device 40. The returning device 40 includes a returning path 41 and a return gas buffer tank 42 (return gas accumulator). An upstream end of the returning path 41 is connected to the switching device 31. As shown in FIGS. 2 to 5, the common permeated gas path 3d is selectively connected to one of the returning path 41 and the forwarding path 3e by the switching device 31.

As shown in FIG. 2, a downstream end of the returning path 41 is joined to the raw material gas path 2a. Preferably, the returning path 41 is connected to the common path portion 2a' of the raw material gas path 2a and more preferably, the returning path 41 is connected to a path portion 2a" of the raw material gas path 2a on an upstream side with respect to the gas forwarding means 2p.

The buffer tank 42 is disposed in an intermediate portion of the returning path 41. A return gas g4 is stored in the buffer tank 42. Gas components of the return gas g4 in the buffer tank 42 are same as those of the product gas g3. Concentrations of the removal object gas components of the return gas g4 are higher than those of the product gas g3.

The returning path 41 is provided with a check valve 44 in a downstream portion thereof with respect to the buffer tank 42.

Actions of the mixed gas production and utilization system S are described hereinafter focusing on actions of the gas separation apparatus 1.

The raw material gas g0 is supplied from the raw material gas supplier 2 to the gas separation apparatus 1.

Figure 5:
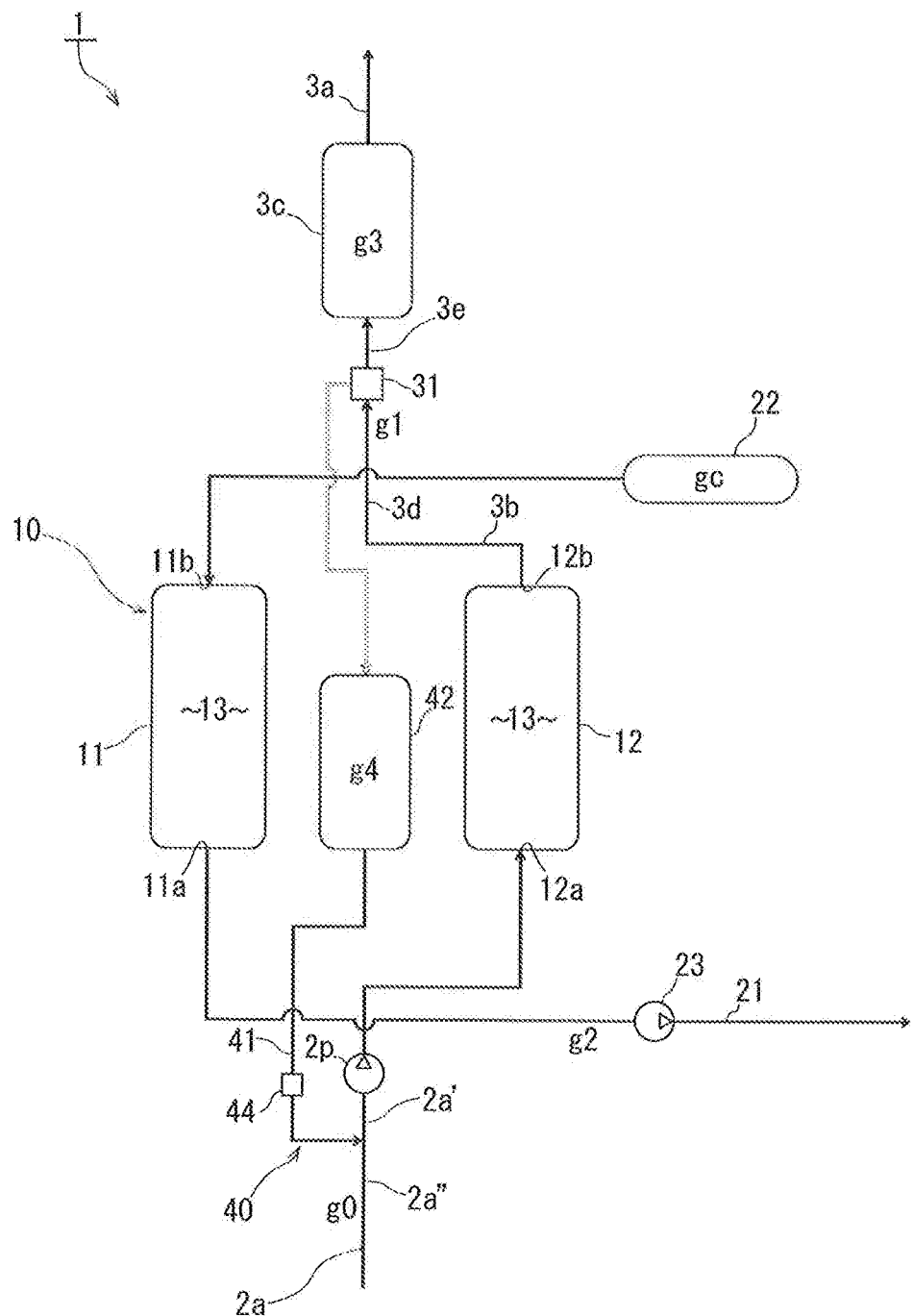
FIG. 5 is a circuit diagram of the gas separation apparatus in a forwarding mode in the second adsorbing-desorbing step.

As shown in FIGS. 2 to 5, an adsorbing step and a desorbing step are alternately and repeatedly performed in the adsorption vessels 11, 12 of the gas separation apparatus 1. Moreover, while the adsorbing step is performed in the first adsorption vessel 11, the desorbing step is performed in the second adsorption vessel 12 (FIGS. 2 and 3). While the adsorbing step is performed in the second adsorption vessel 12, the desorbing step is performed in the first adsorption vessel 11 (FIGS. 4 and 5).

Figure 6:
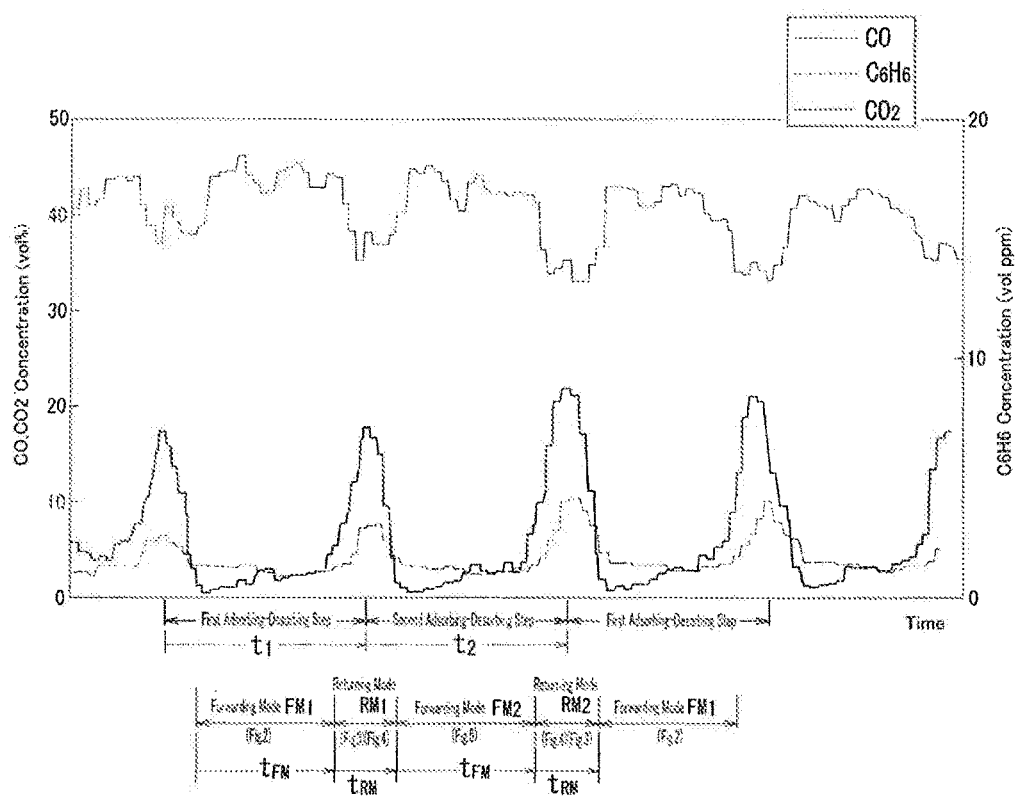
FIG. 6 shows graphs representing measured data on change in concentration of gas components in a permeated gas in the gas separation apparatus.

As shown in FIG. 6, time when the adsorbing step is performed in the first adsorption vessel 11 and the desorbing step is performed in the second adsorption vessel 12 (FIGS. 2 and 3) is referred to as a "first adsorbing-desorbing step" and time when the adsorbing step is performed in the second adsorption vessel 12 and the desorbing step is performed in the first adsorption vessel 11 (FIGS. 4 and 5) is referred to as a "second adsorbing-desorbing step" hereinafter.

<First Adsorbing-Desorbing Step (FIGS. 2 and 3)>

In the first adsorbing-desorbing step, the raw material gas path 2a is connected to the first port 11a of the first adsorption vessel 11 and the permeated gas path 3b is connected to the second port 11b of the first adsorption vessel 11 as mentioned above. And the carrier gas supplying system 22 is connected to the second port 12b of the second adsorption vessel 12 and the desorbed gas path 21 is connected to the first port 12a of the second adsorption vessel 12.

<Adsorbing Step>

The raw material gas g0 is supplied through the raw material gas path 2a to the first adsorption vessel 11 in the adsorbing step. In a process in which the raw material gas g0 passes through the first adsorption vessel 11, the removal object gas components in the raw material gas g0 is adsorbed by the adsorbent 13 in the first adsorption vessel 11. Thereby, the raw material gas g0 becomes a permeated gas g1 rich in the recovery object gas components.

The permeated gas g1 is sent out to the permeated gas path 3b from the first adsorption vessel 11.

As shown in FIG. 6, concentrations of gas components in the permeated gas g1 vary periodically and regularly according to the alternative execution of the adsorption and the desorption in the adsorption vessels 11, 12.

<Desorbing Step>

During the adsorbing step, the carrier gas gc is introduced into the second adsorption vessel 12 in the desorbing step from the carrier gas supplying system 22. And the pressure in the second adsorption vessel 12 is made lower than the one in the adsorbing step by the suctioning device 23. Thereby, the removal object gas components are desorbed from the adsorbent 13 of the second adsorption vessel 12, and an adsorption ability of the second adsorption vessel 12 is renewed. The desorbed removal object gas components are carried by the carrier gas gc, and the desorbed gas g2 is generated. The desorbed gas g2 is sent out to the desorbed gas path 21 from the second adsorption vessel 12 and delivered to the waste gas treatment part (not shown).

<Second Adsorbing-Desorbing Step (FIGS. 4 and 5)>

As shown in FIG. 6, after performing the first adsorbing-desorbing step for a certain length of time $t_1$, the operation is switched to the second adsorbing-desorbing step.

As shown in FIGS. 4 and 5, the raw material gas path 2a is connected to the first port 12a of the second adsorption vessel 12 in the second adsorbing-desorbing step. The permeated gas path 3b is connected to the second port 12b of the second adsorption vessel 12. The carrier gas supplying system 22 is connected to the second port 11b of the first adsorption vessel 11. The desorbed gas path 21 is connected to the first port 11a of the first adsorption vessel 11.

Furthermore, the returning path 41 is joined to the raw material gas path 2a, and further connected to the first port 12a of the second adsorption vessel 12 via the raw material gas path 2a. By connecting the returning path 41 to the common path portion 2a' of the raw material gas path 2a, it is not required to select between the branch pipes of the raw material gas path 2a to the adsorption vessels 11, 12 every time the adsorbing-desorbing steps are switched.

In this arrangement, by the adsorbing step being performed in the second adsorption vessel 12, the raw material gas g0 is fed to the second adsorption vessel 12 under high pressure, and the permeated gas g1 is sent out from the second adsorption vessel 12 to the permeated gas path 3b. And by the desorbing step being performed in the first adsorption vessel 11, the desorbed gas g2 is sent out from the first adsorption vessel 11 to the desorbed gas path 21, and an adsorption ability of the first adsorption vessel 11 is renewed.

As shown in FIG. 6, after performing the second adsorbing-desorbing step for a certain length of time $t_2$, the operation is switched to the first adsorbing-desorbing step. Continuously executing times $t_1$, $t_2$ of the first and second adsorbing-desorbing steps are equal ($t_1=t_2$) to each other. Each of the continuously executing times $t_1$, $t_2$ is about 1 minute, for example. A total ($t_1+t_2$) of the time $t_1$ of the one first adsorbing-desorbing step and the time $t_2$ of the one second adsorbing-desorbing step is one cycle of an operation cycle of the adsorbing device 10.

Note that the graphs of FIG. 6 show results of actual measurements by a gas concentration sensor (see FIG. 7) disposed in the common permeated gas path 3d. There is a time lag between a behavior of gas concentration change shown in FIG. 6 and a tuning for switching between the first and second adsorbing-desorbing steps by a length of time required for the permeated gas g1 to reach the gas concentration sensor from the first adsorption vessel 11 (or the second adsorption vessel 12).

Moreover, as shown in FIG. 6, the forwarding mode (FIGS. 2 and 5) and the returning mode (FIGS. 3 and 4) are alternately selected and executed in the gas separation apparatus 1. The switching between modes is performed by the switching device 31.

The forwarding mode includes a forwarding mode $FM_1$ in the first adsorbing-desorbing step and a forwarding mode $FM_2$ in the second adsorbing-desorbing step.

The returning mode includes a returning mode $RM_1$ from a later period of the first adsorbing-desorbing step to an initial period of the second adsorbing-desorbing step and a returning mode $RM_2$ from a later period of the second adsorbing-desorbing step to an initial period of the first adsorbing-desorbing step.

A duration time $t_{FM}$ (first predetermined time) of the forwarding modes $FM_1$, $FM_2$ is from several tens of seconds to several tens of minutes, for example.

A duration time $t_{RM}$ (second predetermined time) of the returning modes $RM_1$, $RM_2$ is a fraction of the duration time $t_{FM}$ of the forwarding modes $FM_1$, $FM_2$, for example.

A total duration time ($t_{FM}+t_{RM}$) of one forwarding mode and one returning mode equals to each of the duration times $t_1$, $t_2$ of the first and second adsorbing-desorbing steps ($t_{FM}+t_{RM}=t_1=t_2$).

<Forwarding Mode $FM_1$>

As shown in FIG. 6, the forwarding mode $FM_1$ in the first adsorbing-desorbing step is performed during a period other than the initial period and the later period of the first adsorbing-desorbing step. As shown in FIG. 2, in the forwarding mode $FM_1$, the common permeated gas path 3d and the forwarding path 3e are made communicable with each other and the common permeated gas path 3d and the returning path 41 are shut off by the switching device 31.

<Product Gas Accumulating Step>

As shown in FIG. 6, at this time, concentrations of the removal object gas components such as $CO_2$ and $C_6H_6$ of the permeated gas g1 from the first adsorption vessel 11 are sufficiently low. The permeated gas g1 is sent from the permeated gas path 3b, 3d to the forwarding path 3e via the switching device 31. The permeated gas g1 is stored in the buffer tank 3c as the product gas g3. By virtue of the buffer tank 3c, variations in concentration and gas flow rates of the components of the product gas g3 can be averaged.

<Product Gas Supplying Step>

The product gas g3 in the buffer tank 3c is supplied to the gas utilizing part 3 (FIG. 1) via the product gas path 3a as needed.

<Switching to the Returning Mode $RM_1$ in the First Adsorbing-Desorbing Step (Selecting Step)>

As shown in FIG. 6, when the duration time of the forwarding mode $FM_1$ reaches the first predetermined time $t_{FM}$ in the first adsorbing-desorbing step, the operation mode is switched to the returning mode $RM_1$. The timing for switching is preferably set at after a middle period to the later period of the first adsorbing-desorbing step, and more preferably set at around a time when the concentrations of the removal object gas components such as $CO_2$ start to increase.

<Returning Mode $RM_1$>

As shown in FIG. 3, in the returning mode $RM_1$, the common permeated gas path 3d and the returning path 41 are made communicable with each other and the common permeated gas path 3d and the forwarding path 3e are shut off by the switching device 31. As shown in FIG. 6, in the returning mode $RM_1$, the concentrations of the removal object gas components such as $CO_2$ and $C_6H_6$ in the permeated gas g1 from the first adsorption vessel 11 are higher than those in the forwarding mode $FM_1$. The permeated gas g1 is sent from the permeated gas path 3b, 3d to the returning path 41 via the switching device 31 as the return gas g4.

<Return Gas Accumulating Step>

The return gas g4 is temporarily stored in the buffer tank 42. Variations in concentration and gas flow rates of the components of the return gas g4 are averaged in the buffer tank 42. As mentioned above, the concentrations of the removal object gas components in the return gas g4 are higher than those in the product gas g3.

<Returning Step>

The return gas g4 is joined to the raw material gas path 2a via a portion of the returning path 41 located downstream with respect to the buffer tank 42. Thereby, the return gas g4 is returned to the first adsorption vessel 11 with the new raw material gas g0 to be subjected to the adsorbing step again.

By connecting the returning path 41 to the path portion 2a" on the upstream side with respect to the gas forwarding means 2p on the raw material gas path 2a, the return gas g4 can be drawn to the raw material gas path 2a from the returning path 41 by the gas forwarding means 2p. That is, the gas forwarding means 2p also serves as a forwarding means for the return gas g4. Therefore, it is not required to provide a gas forwarding means dedicated to the return gas g4 on the returning path 41.

The returning step is preferably performed continuously during an operating period of the gas separation apparatus 1. That is, the return gas g4 is joined to the raw material gas path 2a not only in the returning mode (FIGS. 3 and 4) but also in the forwarding mode (FIGS. 2 and 5). By accumulating the return gas g4 in the buffer tank 42 in the return gas accumulating step, a flow rate of the return gas g4 in the forwarding mode can be secured.

<Product Gas Supplying Step in the Returning Mode>

Furthermore, the step of supplying the product gas to the gas utilizing part 3 is also performed in the returning mode. As mentioned above, by accumulating the product gas g3 in the buffer tank 3c in the forwarding mode, the product gas g3 in the buffer tank 3c can be supplied to the gas utilizing part 3 (FIG. 1) in the returning mode as well. Further, the product gas g3 can be constantly supplied to the gas utilizing part 3 in a stable manner during the operation of the gas separation apparatus 1.

<Switching of the Adsorbing-Desorbing Steps in the Returning Mode $RM_1$>

As shown in FIG. 6, switching is made from the first adsorbing-desorbing step (FIG. 3) to the second adsorbing-desorbing step (FIG. 4) during the returning mode $RM_1$. Timing for the switching is preferably set at around a middle period of the returning mode $RM_1$, and more preferably set at around a time when the concentrations of the removal object gas components measured by the concentration sensor are at their peaks.

In other words, the switching device 31 is maintained in a state shown in FIG. 3 after the switching from the first adsorbing-desorbing step to the second adsorbing-desorbing step, and the returning mode is continued for a while. As shown in FIG. 4, the common permeated gas path 3d and the returning path 41 are made communicable with each other and the common permeated gas path 3d and the forwarding path 3e are shut off by the switching device 31. Thereby, the permeated gas g1 from the second adsorption vessel 12 is sent to the returning path 41 as the return gas g4 and stored in the buffer tank 42 (return gas accumulating step) and the permeated gas g1 is joined to the raw material gas path 2a and returned to the second adsorption vessel 12 (returning step). As a result, the removal object gas components left in the second adsorption vessel 12 and in the pipes that continue to the second adsorption vessel 12 can be prevented from being mixed with the product gas g3.

<Switching to the Forwarding Mode $FM_2$ in the Second Adsorbing-Desorbing Step (Selecting Step)>

As shown in FIG. 6, when the duration time of the returning mode $RM_1$ reaches the predetermined time $t_{RM}$, the operation mode is switched to the forwarding mode $FM_2$ (FIG. 5). Timing for switching is preferably set at around a time when changes in the concentrations of the removal object gas components such as $CO_2$ start to decrease.

<Forwarding Mode $FM_2$>

Thereby, the forwarding mode $FM_2$ is performed from after the initial period to the later period of the second adsorbing-desorbing step. That is, as shown in FIG. 5, the common permeated gas path 3d and the forwarding path 3e are made communicable with each other and the common permeated gas path 3d and the returning path 41 are shut off by the switching device 31.

As shown in FIG. 6, at this time, the concentrations of the removal object gas components in the permeated gas g1 from the second adsorption vessel 12 are sufficiently low. The permeated gas g1 is stored in the buffer tank 3c as the product gas g3 via the switching device 31 and the forwarding path 3e (product gas accumulating step). Furthermore, the product gas g3 in the buffer tank 3c is supplied to the gas utilizing part 3 (FIG. 1) via the product gas path 3a (product gas supplying step).

<Switching to the Returning Mode $RM_2$ in the Second Adsorbing-Desorbing Step (Selecting Step)>

As shown in FIG. 6, when the duration time of the forwarding mode $FM_2$ reaches the predetermined time $t_{FM}$, the operation mode is switched to the returning mode $RM_2$ by the switching device 31. That is, the gas separation apparatus 1 is brought to a state of the circuit shown in FIG. 4. At this time, the concentrations of the removal object gas components in the permeated gas g1 from the second adsorption vessel 12 are relatively high. The permeated gas g1 is sent to the returning path 41 as the return gas g4 and stored in the buffer tank 42 (return gas accumulating step) and the permeated gas g1 is joined to the raw material gas path 2a (returning step).

<Switching of the Adsorbing-Desorbing Steps in the Returning Mode $RM_2$>

Moreover, during the returning mode $RM_2$, switching is made from the second adsorbing-desorbing step (FIG. 4) to the first adsorbing-desorbing step (FIG. 3). In other words, as shown in FIG. 3, the switching device 31 is maintained in the state shown in FIG. 4 after the switching from the second adsorbing-desorbing step to the first adsorbing-desorbing step, and the returning mode $RM_2$ is continued for a while. Thereby, the removal object gas components left in the first adsorption vessel 11 and in the pipes that continue to the first adsorption vessel 11 can be prevented from being mixed with the product gas g3.

<Switching to the Forwarding Mode $FM_1$ in the First Adsorbing-Desorbing Step (Selecting Step)>

As shown in FIG. 6, when the duration time of the returning mode $RM_2$ reaches the predetermined time $t_{RM}$, the operation mode is switched to the forwarding mode $FM_1$ (FIG. 2).

The operations given above are repeated.

Since the concentrations of the gas components in the permeated gas g1 vary periodically and regularly (FIG. 6), the switching of modes can be performed by time management.

The gas separation apparatus 1 operates in accordance with the cyclic variation (operation cycle) of the concentrations of the gas components in the permeated gas g1. During a time when the concentrations of the removal object gas components are low, the permeated gas g1 can be provided for use as the product gas g3 by selecting the forwarding mode. During a time when the concentrations of the removal object gas components are relatively high, the permeated gas g1 can be provided as the return gas g4 instead of the product gas g3 by selecting the returning mode. Accordingly, the concentrations of the removal object gas components in the product gas g3 can be made low, and performance of removing the removal object gas components can be secured. Moreover, it is not required to shorten a time interval for switching between the adsorption and desorption more than necessary. Frequency of exhausting the recovery object gas components accompanying the switching can be constrained, and therefore, reduction in a recovery rate of the recovery object gas components can be prevented. As a result, the removal performance and the recovery rate can be both satisfied. Moreover, by returning the return gas g4 to the raw material gas g0, a required flow rate of the raw material gas g0 can be reduced.

Other embodiments of the present invention will be described hereinafter. Same reference numerals are used in the drawings to designate same parts as those in the foregoing embodiment and description thereof will be omitted.

Second Embodiment

Figure 7:
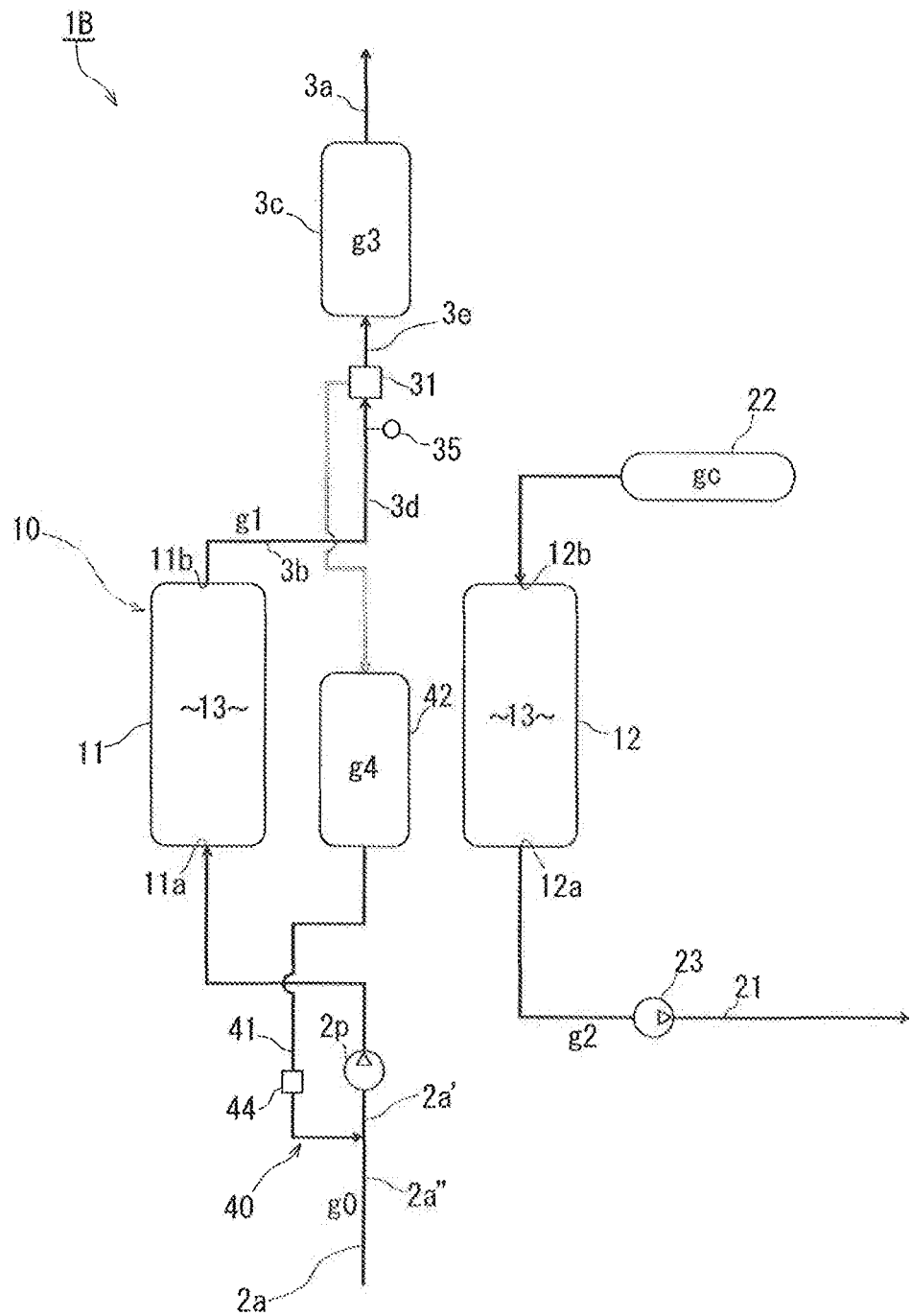
FIG. 7 is a circuit diagram of a gas separation apparatus according to a second embodiment of the present invention in a state corresponding to FIG. 2 showing the first embodiment (forwarding mode in a first adsorbing-desorbing step).

FIG. 7 shows a gas separation apparatus 1B according to a second embodiment of the present invention. In the gas separation apparatus 1B, a concentration sensor 35 (concentration meter) is disposed on a common permeated gas path 3d. The concentration sensor 35 measures a concentration of one measurement object gas component among removal object gas components in a permeated gas g1. Preferably, the measurement object gas component is $CO_2$. That is, preferably, the measurement object gas component is a low adsorptive removal object gas component that has lower adsorptive property by an adsorbing device 10 than a priority removal object gas component (BTEX such as $C_6H_6$).

In the second embodiment, selection between a forwarding mode and a returning mode is made based on the concentration measured by the concentration sensor 35. If the measured concentration is lower than a threshold, the forwarding mode is selected. If the measured concentration is not lower than the threshold, the returning mode is selected. Thereby, switching of modes can be performed according to the actual variation of the concentration in the permeated gas g1.

As shown in FIG. 6, a $CO_2$ concentration of the permeated gas g1 sent out from an adsorption vessel 11, 12 under an adsorbing step starts to increase faster than a concentration of $C_6H_6$. Accordingly, by making the $CO_2$ the measurement object gas component, the returning mode can be performed at a time when the concentration of $C_6H_6$ has not yet started to rise. Thereby, the concentration of $C_6H_6$ in the product gas g3 can be surely made low.

For example, preferably, the threshold for the switching of modes is set at a value of about 5 to 10% (preferably 7%) of a peak height of the $CO_2$, for example.

Alternatively, other removal object gas components such as $C_6H_6$ may be made the measurement object gas component. The sensor 35 may measure a partial pressure instead of concentration.

Third Embodiment

Figure 8:
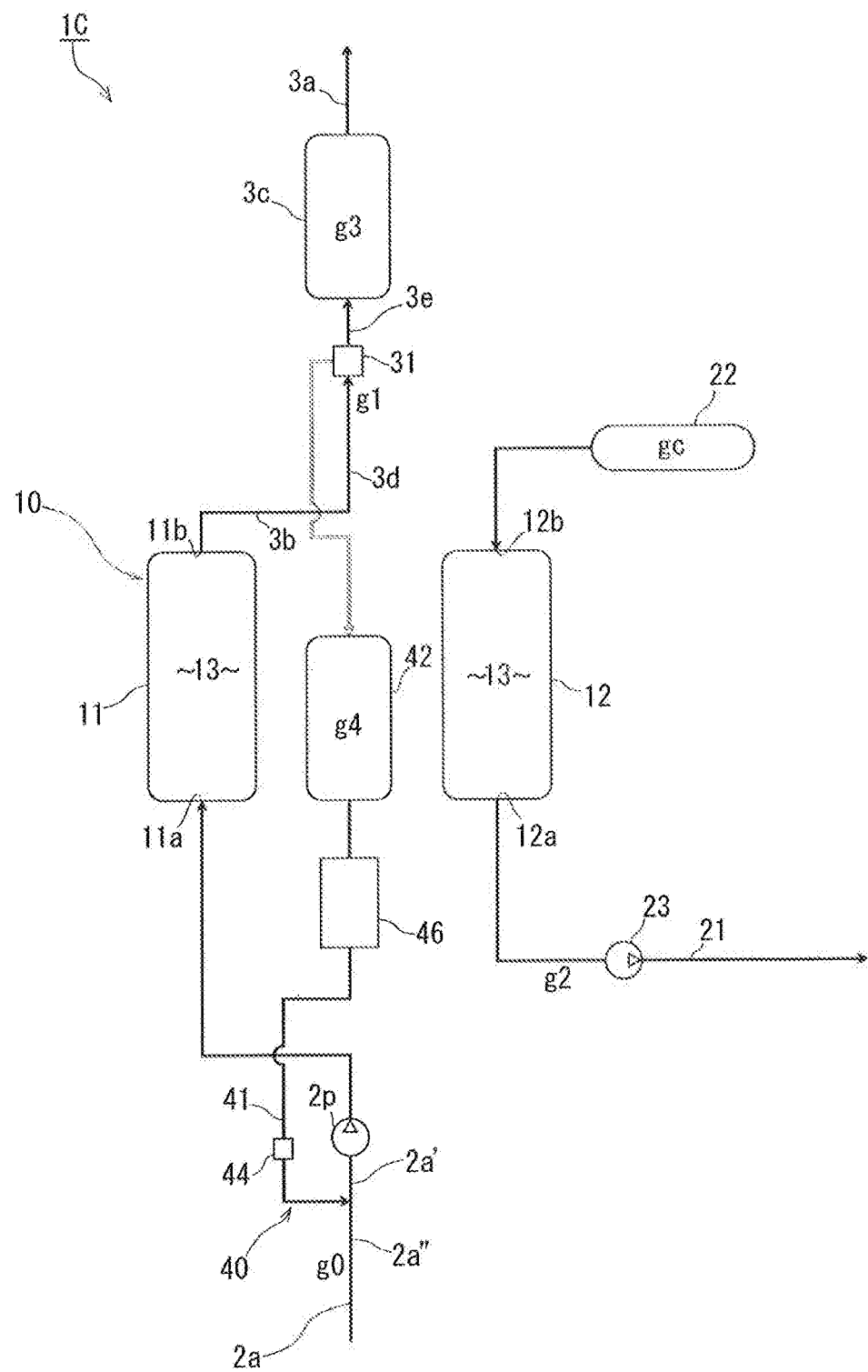
FIG. 8 is a circuit diagram of a gas separation apparatus according to a third embodiment of the present invention in a state corresponding to FIG. 2 showing the first embodiment (forwarding mode in a first adsorbing-desorbing step).

FIG. 8 shows a third embodiment of the present invention. In a gas separation apparatus 1C according to the third embodiment, a returning device 40 includes a water vapor reformulating device 46 (reformulating device). The water vapor reformulating device 46 is disposed in a middle of a returning path 41. While the water vapor reformulating device 46 is disposed on a portion of the returning path 41 on a downstream side with respect to a buffer tank 42 in FIG. 7, the water vapor reformulating device 46 may be disposed on a portion of the returning path 41 on a switching device 31 side with respect to the buffer tank 42.

The water vapor reformulating device 46 reformulates a return gas g4 to be rich in recovery object gas components by a catalytic chemical response.

Specifically, the following reaction occurs in the water vapor reformulating device 46:

$$CO + H_2O \rightarrow CO_2 + H_2 \qquad (1)$$

Thereby, a concentration of $H_2$ in the return gas g4 can be increased. The return gas g4 rich in $H_2$ is joined a raw material gas g0.

This embodiment is effective to refine, of CO and $H_2$, particularly $H_2$, and a required flow rate of the raw material gas g0 can be further reduced.

Moreover, gas rich in CO can be obtained by performing a reverse reaction of the expression (1), $CO + H_2O \leftarrow CO_2 + H_2$.

Fourth Embodiment

Figure 9:
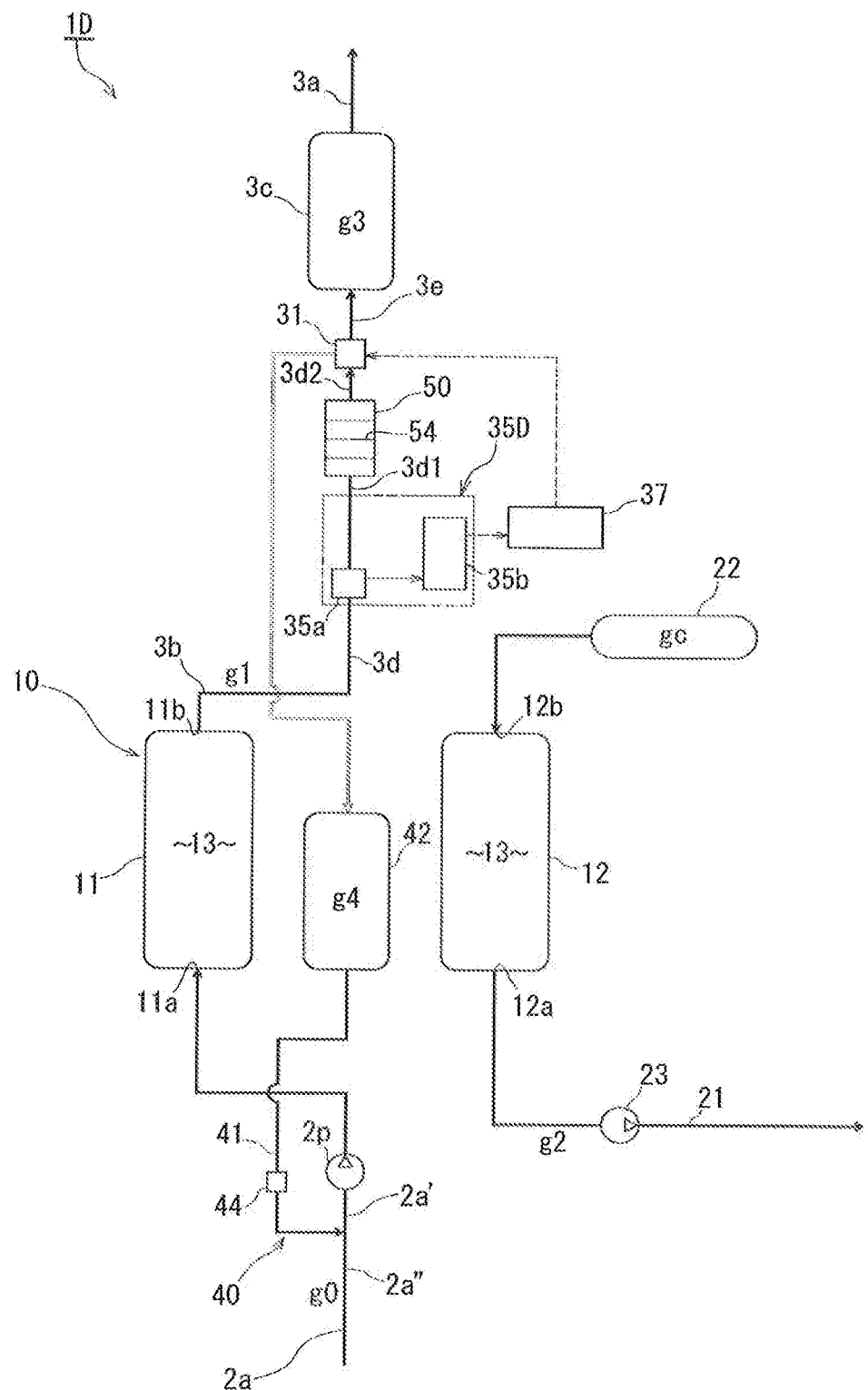
FIG. 9 is a circuit diagram of a gas separation apparatus according to a fourth embodiment of the present invention in a state corresponding to FIG. 2 showing the first embodiment (forwarding mode in a first adsorbing-desorbing step).

FIGS. 9 to 12 show a fourth embodiment of the present invention. The fourth embodiment is a modification of the second embodiment (FIG. 7). As shown in FIG. 9, in a gas separation apparatus 1D according to the fourth embodiment, a concentration meter 35D and a delay means 50 are disposed on a permeated gas path 3d.

The concentration meter 35D includes a collecting portion 35a and a composition analyzing portion 35b. The collecting portion 35a is disposed in a middle of the permeated gas path 3d. The composition analyzing portion 35b is connected to the collecting portion 35a. The composition analyzing portion 35b is composed of a mass analyzer, a gas chromatography, or the like.

A sensing signal line of the composition analyzing portion 35b is connected to a controller 37. Although not shown in detail in the drawings, the controller 37 includes a CPU and a switching drive circuit or the like. A control signal line of the controller 37 is connected to a switching device 31.

The controller 37 and the switching device 31 constitute a "selector".

A portion of a permeated gas g1 is taken as a sample in the collecting portion 35a. The sampling is performed in accordance with an operation cycle of adsorption vessels 11, 12, at an interval of 1 minute, for example.

A composition of the sample of the gas g1 is analyzed by the composition analyzing portion 35b. Specifically, a concentration of a removal object component, $C_6H_6$, for example, in the gas g1 is measured. A concentration of $CO_2$ may be measured.

Results of the measurement are fed to the controller 37. Based on the results of the measurement, the controller 37 operates the switching device 31 composed of a three-way valve. Thereby, either one of a forwarding mode (refer to FIGS. 9 and 5) and a returning mode (refer to FIGS. 3 and 4) is selected.

A processing time $t_s$ from the sampling (start of measurement) by the collecting portion 35a to the operation of the switching device 31 (execution of selection) is about $t_s=1$ minute, for example.

The delay means 50 is disposed in a portion of the permeated gas path 3d between the collecting portion 35a and the switching device 31. The delay means 50 includes a delay path 51. The delay path 51, and further the delay means 50 is configured to allow the gas to pass therethrough taking a certain delay time $t_D$. The delay time to is set according to the processing time $t_s$ from the start of measurement to the execution of selection.

For example, the delay time $t_D$ is not less than half the processing time $t_s$ and not more than twice the processing time $t_s$ ($t_D=0.5\ t_s$ to $2\ t_s$). Preferably, the delay time $t_D$ is sufficiently close to the processing time $t_s$ ($t_D$=0.8 $t_s$ to 1.2 $t_s$, for example) or approximately equal to the processing time $t_s$ ($t_D \approx t_s$).

The delay time $t_D$ is set at approximately $t_D$=1 minute in this embodiment.

Moreover, the delay means 50 is configured such that preferably the gases are almost never mixed in the delay path 51 and a gas portion that entered the delay path 51 relatively earlier is flown out earlier than a gas portion that entered the delay path 51 relatively later.

Figure 10:
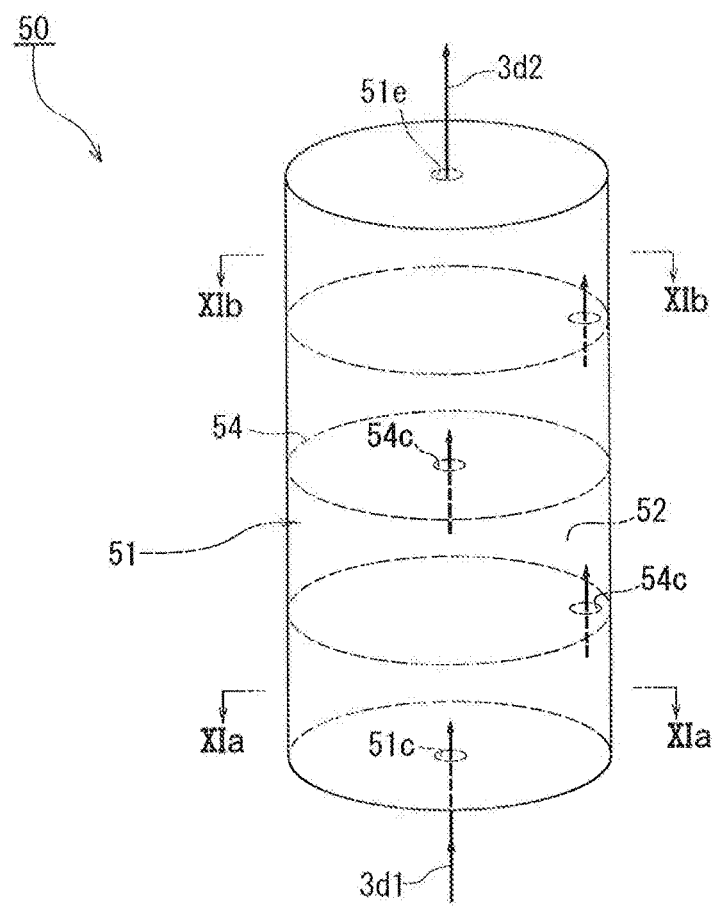
FIG. 10 is a perspective view of an example of a delay means of the gas separation apparatus according to the fourth embodiment.

For example, the delay means 50 has a circular cylindrical configuration as shown in FIG. 10. An inside of the delay means 50 is divided into four layers (multiple layers), for example, of delay chambers 52 by divisions 54.

Figure 11A:
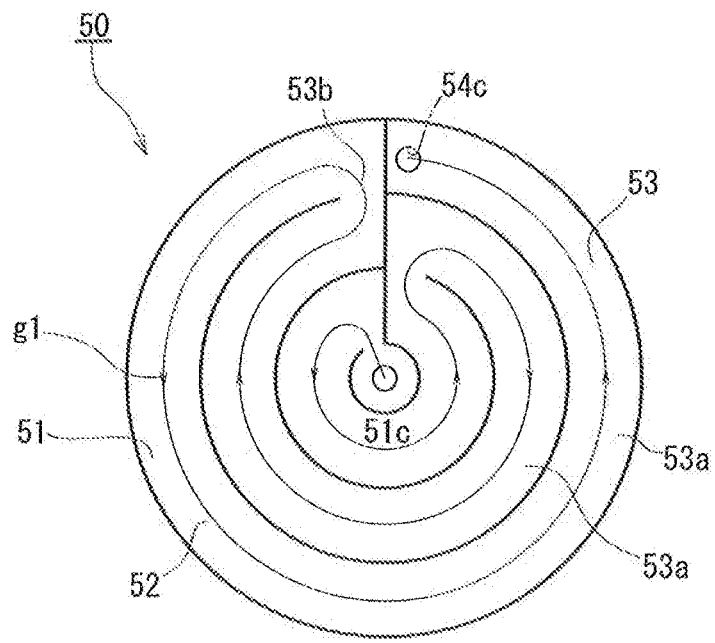
FIG. 11(a) is a cross-sectional view of the delay means taken along line XIa-XIa of FIG. 10.
Figure 11B:
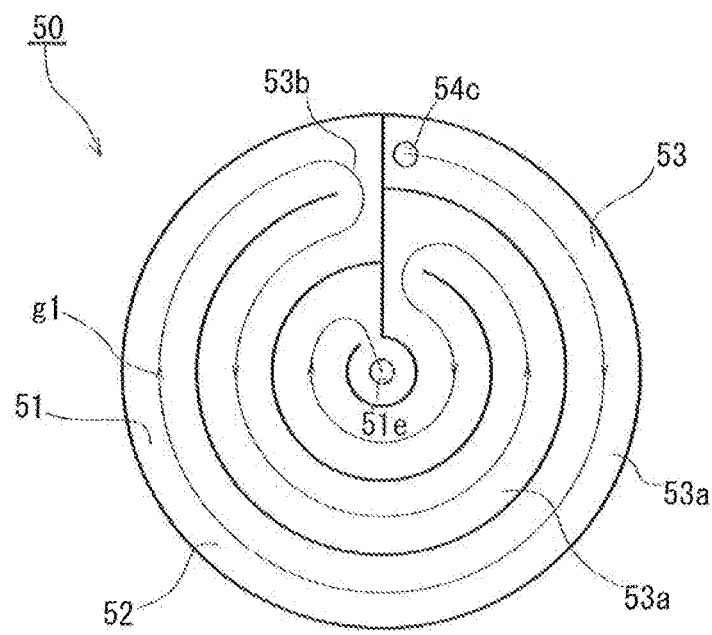
FIG. 11(b) is a cross-sectional view of the delay means taken along line XIb-XIb of FIG. 10.

As shown in FIG. 11, a delay path portion 53 is formed in each layer of the delay chambers 52. The delay path portion 53 has a configuration of multiple concentric circles and multiple circular path portions 53a unicursally continue to each other via return path portions 53b.

As shown in FIG. 10, a communication path 54c is formed in a predetermined portion (an outer peripheral portion or a central portion) of each of the divisions 54. The delay path portions 53, 53 adjacent to each other one above the other are continuous through the communication path 54c. Further, the multiple layers (four layers) of the delay path portions 53 are continuous in a row, thereby forming the delay path 51.

As shown in FIG. 10, a permeated gas path 3d1 from the collecting portion 35a continues to an inlet port 51c of the delay path portion 53 on a most upstream side layer (bottom layer in FIG. 10). A permeated gas path 3d2 on a downstream side extends to the switching device 31 from an outlet port 51e of the delay path portion 53 on a most downstream side layer (top layer in FIG. 10).

Let us assume that the concentration of the removal object component ($C_6H_6$, for example) in the permeated gas g1 from the adsorption vessel 11 is increased above a threshold level now. The permeated gas g1 flows in the delay path 51 taking the time ($t_D$) of approximately one minute. During that time, the concentration of the permeated gas g1 is measured by the concentration meter 35D and judged by the controller 37. Thereby, the controller 37 operates the switching device 31 (execution of selection) approximately one minute ($t_s$) after the concentration is increased above the threshold level.

Thereby, the permeated gas g1 whose concentration is below the threshold level can be sent to a buffer tank 3c and the permeated gas g1 whose concentration is above the threshold level can be returned to a raw material gas path 2a via a returning path 41. In other words, the permeated gas g1 whose concentration is above the threshold level can be prevented from being sent to the buffer tank 3c during the processing time $t_S$.

As a result, contamination of a product gas g3 by the removal object component (such as $C_6H_6$) can be prevented or constrained, and an operation time lag of the concentration meter 35D and the controller 37 can be compensated.

Figure 12:
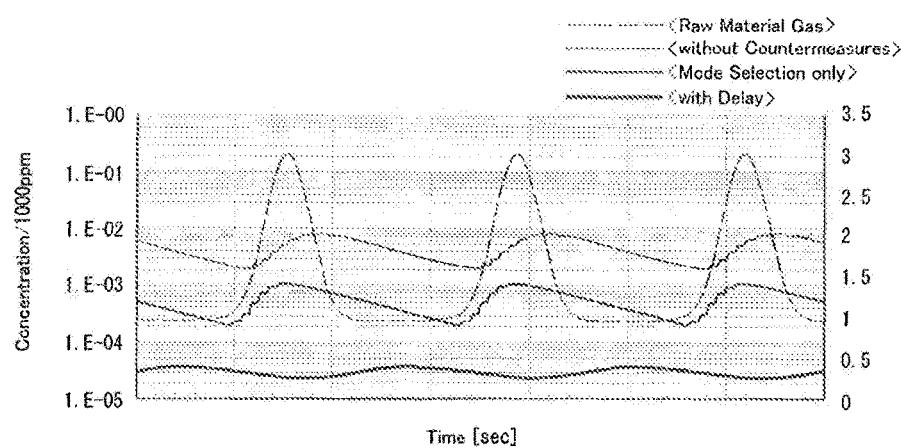
FIG. 12 shows graphs simulating changes in concentration of benzene in a product gas corresponding to variations of concentration of benzene in a raw material gas in the fourth embodiment.

FIG. 12 shows a simulation of a change of the concentration of $C_6H_6$ (logarithmic scale) in the product gas g3 in a product gas path 3a at an outlet port of the buffer tank 3c assuming that the concentration of $C_6H_6$ (number line scale) in the raw material gas g0 from a raw material gas supplier 2 varies in a cyclic manner.

<Without Countermeasures> in FIG. 12 means a condition where a returning step is not provided and the permeated gas g1 is always provided as the product gas g3.

<Mode Selection Only> in FIG. 12 means a condition where the gas separation apparatus 1 according to the first embodiment (FIGS. 2 to 5), in which the delay means 50 is not provided, is operated.

<With Delay> in FIG. 12 means a condition where the gas separation apparatus 1D according to the fourth embodiment (FIG. 9), in which the delay means 50 is provided, is operated.

It was confirmed that the concentration of $C_6H_6$ in the product gas g3 declines more when the modes are selected (FIGS. 2 to 5) than when no countermeasures are provided, and declines further more by delaying the permeated gas g1 by the delay means 50.

Figure 13:
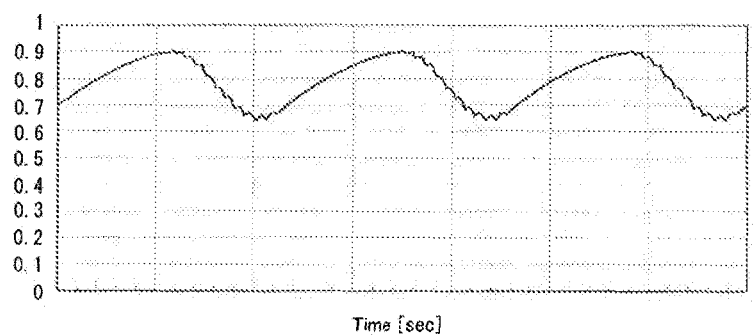
FIG. 13 shows a graph simulating a quantity of gas flowing into a buffer tank in FIG. 12.

FIG. 13 shows a simulation of a change in an amount of gas flown into the buffer tank 3c in the condition <Mode Selection Only> or the condition <With Delay> in FIG. 12. It was confirmed that even if the permeated gas g1 is returned to the raw material gas path 2a in the returning mode, generally 75 percent of an amount of gas that would exist without the permeated gas g1 being returned can be secured.

In the fourth embodiment, the delay means 50 may be made of continuous multiple layers of chambers. Even if the gas may be mixed to a certain degree in each chamber, in the delay means 50 as a whole, the gas portion that entered relatively earlier is flown out earlier than the gas portion that entered relatively later.

The delay means 50 may be made of a longitudinal pipe. Preferably, the pipe is made compact by making it into a coiled shape or by winding it.

In the returning step of the fourth embodiment, the gas in the delay means 50 may be flown backward and flown out of the inlet port 51c and returned to the adsorbing device 10. That is, the gas portion that entered the delay means 50 relatively later may be returned earlier.

Timing for switching modes in the present invention may be determined not only in accordance with the operation cycle of the adsorbing device 10 but also in accordance with an operation cycle of the raw material gas supplier 2 or the like.

The gas that is returned as the return gas g4 is not limited to the permeated gas g1. A desorbed gas g2 or the like may be returned as the return gas.

Fifth Embodiment

Figure 14:
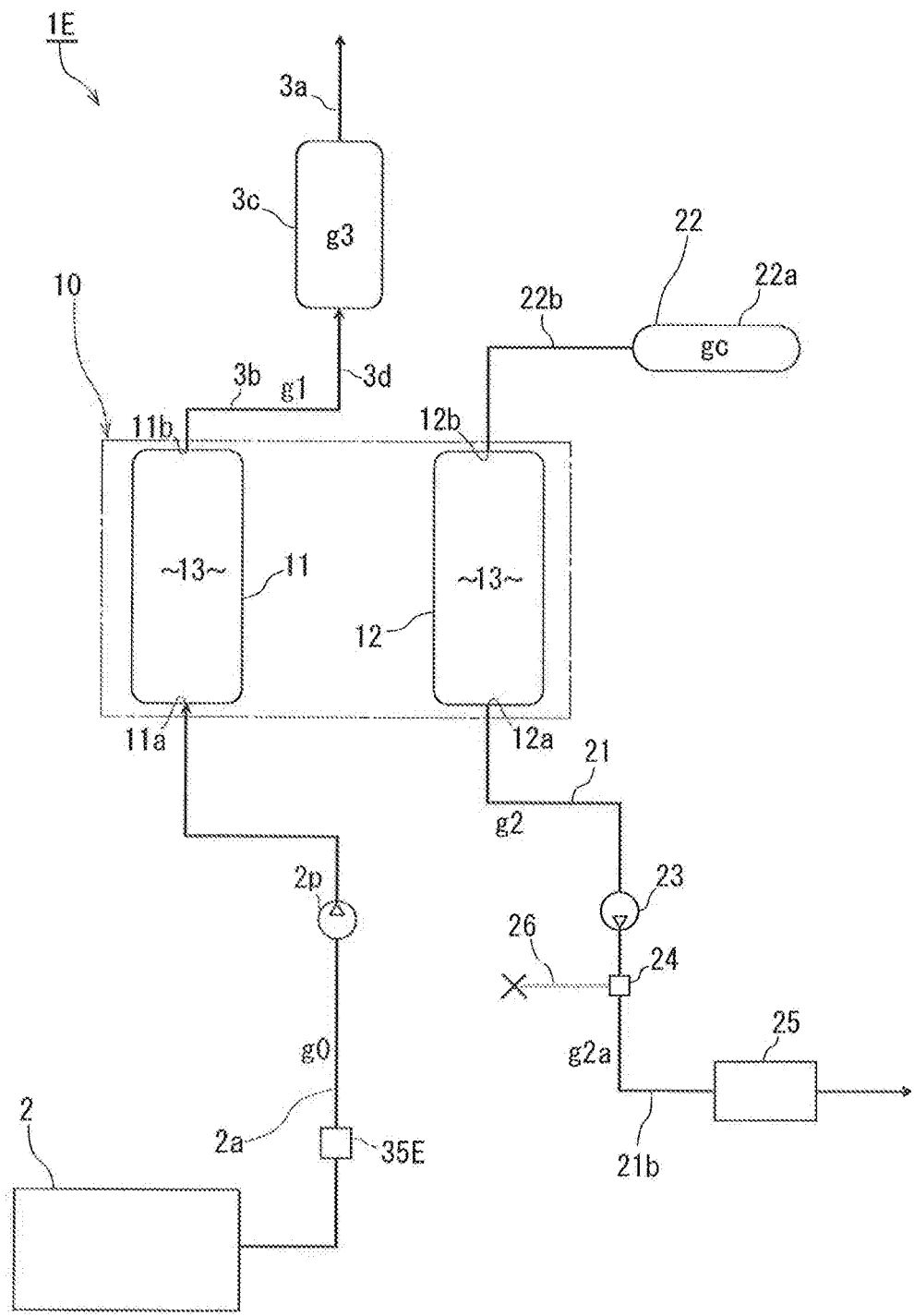
FIG. 14 is a circuit diagram of a gas separation apparatus according to a fifth embodiment of the present invention in a forwarding mode in a first adsorbing-desorbing step.
Figure 15:
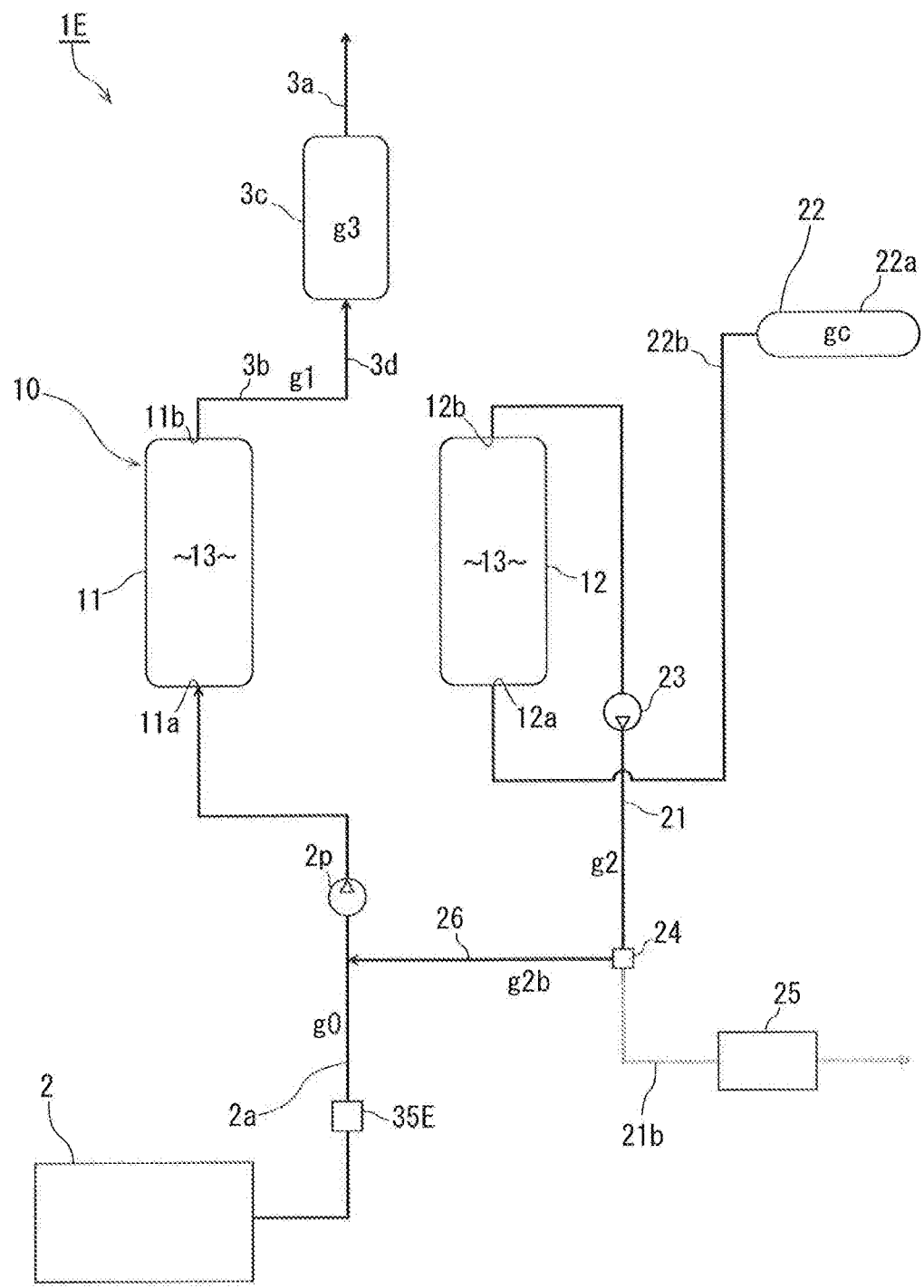
FIG. 15 is a circuit diagram of the gas separation apparatus according to the fifth embodiment of the present invention in a returning mode in the first adsorbing-desorbing step.

FIGS. 14 and 15 show a fifth embodiment of the present invention.

In a raw material gas supplier 2 that is a waste disposal facility, concentrations of gas components of a raw material gas g0 vary due to a provision interval or the like of wastes to be burnt. Time scale of the variation is sufficiently longer than an operation cycle of an adsorbing device 10, which may be around 1 hour, for example. That is, a concentration of $CO_2$ or the like in the raw material gas g0 vary in a scale of around 1 hour, for example.

An adsorbent 13 in an adsorption vessel 11, 12 has a high adsorptive property with respect to $CO_2$ (recovery object gas component). The adsorbent 13 also has a certain adsorptive property with respect to CO (recovery object gas component). If the concentration of $CO_2$ in the raw material gas g0 is reduced too much, the adsorbent 13 adsorbs CO, and thereby, a recovery rate of CO declines.

To cope with this problem, in a gas separation apparatus 1E according to the fifth embodiment, a forwarding mode and a returning mode are switched according to the concentration of $CO_2$ (or a partial pressure of $CO_2$) in the raw material gas g0. As shown in FIG. 14, a raw material gas path 2a is provided with a concentration sensor 35E (measuring means). The concentration sensor 35E measures the concentration of $CO_2$ in the raw material gas path 2a.

In the fifth embodiment, a target of switching between the forwarding mode and the returning mode is not a permeated gas g1, but a desorbed gas g2. The desorbed gas g2 is provided as a forward gas g2a in the forwarding mode (FIG. 14) and provided as a return gas g2b in the returning mode (FIG. 15).

As shown in FIG. 14, a switching device 24 (selector) for switching modes is disposed in a portion of a desorbed gas path 21 on a downstream side with respect to a suction pump 23. The switching device 24 includes a three-way valve and selectively connects the desorbed gas path 21 to either a desorbed gas exhaust path 21b or a return path 26. The desorbed gas exhaust path 21b is provided with an exhaust gas treatment part 25. The return path 26 is connected to the raw material gas path 2a.

As shown in FIG. 14, in a normal time, that is when the concentration of $CO_2$ in the raw material gas g0 is in a normal range, the gas separation apparatus 1E is in the forwarding mode. In the forwarding mode, the switching device 24 makes the desorbed gas path 21 and the desorbed gas exhaust path 21b communicable with each other and shuts off the return path 26. Thereby, the desorbed gas g2 from the desorbed gas path 21 is sent to the exhaust gas treatment part 25 as the forward gas g2a. The desorbed gas g2 is burnt in the exhaust gas treatment part 25 and rendered harmless. The gas rendered harmless is exhausted out of the system.

In the fifth embodiment, a first adsorbing-desorbing step (FIGS. 14 and 15) and a second adsorbing-desorbing step (not shown) similar to those in the first embodiment are alternately performed. As shown in FIG. 14, in the first adsorbing-desorbing step, the raw material gas g0 is supplied to the first adsorption vessel 11 and the removal object gas components such as BTEX and $CO_2$ are adsorbed in the first adsorption vessel 11. Moreover, a carrier gas gc such as $N_2$ is supplied to the second adsorption vessel 12 and desorbed in the second adsorption vessel 12.

Although not shown in the drawings, in the second adsorbing-desorbing step, the raw material gas g0 is supplied to the second adsorption vessel 12 and the removal object gas components such as BTEX and $CO_2$ are adsorbed in the second adsorption vessel 12. Moreover, the carrier gas gc is supplied to the first adsorption vessel 11 and desorbed in the first adsorption vessel 11.

In the description below, of the first adsorbing-desorbing step and the second adsorbing-desorbing step, the adsorbing device 10 is performing the first adsorbing-desorbing step unless otherwise mentioned (the same applies to the sixth embodiment to be described later).

As shown in FIG. 14, in the forwarding mode, a carrier gas supply path 22b is connected to a second port 12b of the second adsorption vessel 12 in the desorbing step, and the desorbed gas path 21 is connected to a first port 12a of the second adsorption vessel 12.

In the gas separation apparatus 1E, the concentration of $CO_2$ in the raw material gas g0 is monitored by the concentration sensor 35E. When a concentration measured by the concentration sensor 35E is below a threshold, the operation mode is switched to the returning mode (FIG. 15). In the returning mode, the desorbed gas g2 is returned to the desorbing step as the return gas g2b while the first adsorbing-desorbing step and the second adsorbing-desorbing step are alternately repeated.

Specifically, as shown in FIG. 15, the switching device 24 in the returning mode makes the desorbed gas path 21 and the return path 26 communicable with each other and shuts off the desorbed gas exhaust path 21b. Thereby, the desorbed gas g2 rich in $CO_2$ from the second adsorption vessel 12 in the desorbing step is returned as the return gas g2b to the first adsorption vessel 11 in the adsorbing step via the return path 26, while being mixed with the raw material gas g0 in the raw material gas path 2a. Thereby, the concentration of $CO_2$ in the first adsorption vessel 11 can be increased. And, by having the $CO_2$ adsorbed by the adsorbent 13 in the first adsorption vessel 11, the CO in the raw material gas g0 can be prevented from being adsorbed by the adsorbent 13. When the CO is adsorbed by the adsorbent 13 in the first adsorption vessel 11, the CO can be substituted with the $CO_2$.

As a result, the recovery rate of the CO (recovery object gas component) can be improved.

Normally, the concentration of BTEX in the second adsorption vessel 12 in the desorption step is lower on the second port 12b side than on the first port 12a side. So, as shown in FIG. 15, preferably in the desorbing step in the returning mode, the carrier gas supply path 22b is connected to the first port 12a of the second adsorption vessel 12 and the desorbed gas exhaust path 21 is connected to the second port 12b. Thereby, the return gas g2b can be taken from the second port 12b, and the BTEX can be prevented or constrained from being transferred to the first adsorption vessel 11. That is, even the desorbed gas g2 can be provided as the return gas g2b as long as the concentration or the partial pressure of the priority removal object gas component such as BTEX is lower than in the raw material gas g0.

In the gas separation apparatus 1E, the returning device 40 of the first embodiment (refer to FIG. 2) is omitted.

Alternatively, a returning device 40 may be added to the gas separation apparatus 1E and a returning step for a return gas g4 (FIG. 2) in accordance with the operation cycle of the adsorbing device 10 may be performed in parallel.

Without connecting the carrier gas supply path 22b to the second adsorption vessel 12, desorption may be performed by negative pressure suction of the desorbed gas exhaust path 21.

Sixth Embodiment

Figure 16:
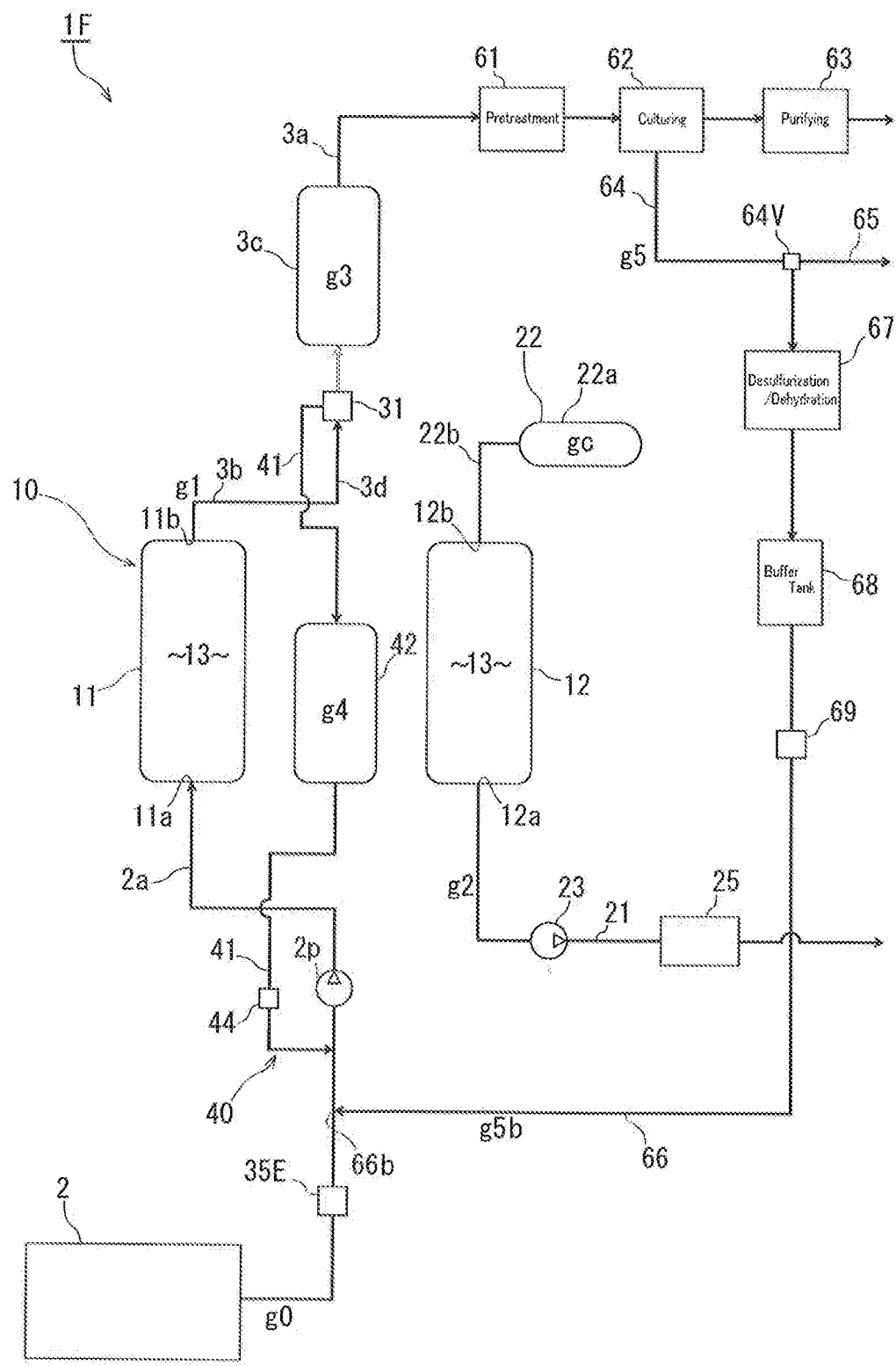
FIG. 16 is a circuit diagram of a gas separation apparatus according to a sixth embodiment of the present invention in a state corresponding to FIG. 3 showing the first embodiment (returning mode in a first adsorbing-desorbing step).

FIG. 16 shows a sixth embodiment of the present invention. Similar to the fifth embodiment (FIGS. 14 and 15), the sixth embodiment corresponds to a variation of states of a raw material gas in a long time scale away from operation cycles of an adsorbing device 10. A gas separation apparatus 1F selects whether to execute a returning step or not according to a concentration of $CO_2$, for example, of a raw material gas g0. Moreover, in the gas separation apparatus 1F, a product gas g3, that is a permeated gas g1, is reformulated, and the reformulated permeated gas is provided as a return gas g5b, The return gas g5b hardly contains a priority removal object gas component such as BTEX and is a clean $CO_2$-rich gas with a water content and $H_2S$ removed as appropriate.

Specifically, a culture vessel 62 is connected to a product gas path 3a (gas forwarding path) of the gas separation apparatus 1F via an additional pretreatment part 61.

The additional pretreatment part 61 removes impurities from the product gas g3 (permeated gas) by thermal swing adsorption (TSA) or by a catalyst, an activated carbon or the like. The impurities may include BTEX such as $C_6H_6$ that escaped removal by the adsorbing device 10, oxygen ($O_2$)

and acethylene ($C_2H_2$). The oxygen and the acetylene are subjected to a catalytic reaction with $H_2$ in the product gas g3 and converted into components such as water vapor or ethylene that are harmless to the culturing to be discussed later. After that, the product gas g3 (permeated gas) is supplied to the culture vessel 62.

In the culture vessel 62, anaerobic mocroorganisms are cultured in a liquid culture medium, for example. The microorganisms intake CO and $H_2$ from the product gas g3 (permeated gas) and produce ethanol ($C_6H_6O$) that is a valuable material by fermentation. In addition, acetic acid, butanediol, isoprene or the like are also produced by fermentation. Examples of such microorganisms may be anaerobic bacteria disclosed in the Japanese Unexamined Patent Application Publication No. 2014-050406, International Patent Application Publication No. WO02011/087380 and US Patent Application Publication No. 2013/0065282.

The liquid culture medium containing the product of the fermentation is sent to a purifying part 63, and the ethanol is purified in the purifying part 63.

As shown in the following equations (1) and (2), $CO_2$ is produced when the ethanol is produced in the culture vessel 62 by fermentation to keep mass balance and energy balance:

$$6CO + 3H_2O \rightarrow C_2H_6O + 4CO_2 \quad (1)$$

$$6H_2 + 2CO_2 \rightarrow C_2H_6O - 3H_2O \quad (2)$$

That is, when 6 mole each of CO and $H_2$ are consumed, 2 mole of ethanol is generated and 4−2=2 mole of $CO_2$ is generated.

Therefore, an off-gas g5 from the culture vessel 62 is rich in $CO_2$. That is, the permeated gas g1 is reformulated in the culture vessel 62 to be rich in $CO_2$. The culture vessel 62 constitutes a reformulating device.

An off-gas path 64 extends from the culture vessel 62. The off-gas path 64 is bifurcated into a vent path 65 and a returning path 66 via a directional control valve 64V such as a three-way valve. An off-gas treatment part 67, a buffer tank 68 (return gas accumulator) and a pressure-flow rate control on-off valve 69 are disposed on the returning path 66 in this order from the directional control valve 64V side.

The off-gas treatment part 67 performs treatment of the off-gas g5 such as desulfurization and dehydration. Both of the desulfurization and the dehydration may be performed. Alternatively, either one of the desulfurization and the dehydration may be performed. Required treatment may be selected and performed according to a composition of the off-gas g5.

The off-gas g5 after the desulfurization and/or the dehydration is homogenized by being stored in the buffer tank 68.

The pressure-flow rate control on-off valve 69 has a pressure control or flow rate control function and a switching function. Normally, a pressure of a portion of the return path 66 on an upstream side of the pressure-flow rate control on-off valve 69, and further a pressure of the off-gas path 64 is 1.05 to several times an atmospheric pressure and is higher than a pressure of the raw material gas g0 (atmospheric pressure±α).

A downstream end of the return path 66 is connected to a raw material gas path 2a.

The return path 66, the buffer tank 68 and the pressure-flow rate control on-off valve 69 constitute a returning device.

Alternatively, the return path 66 may be provided with a squeeze pump for returning (not shown). The returning device may further include the squeeze pump for returning.

During a normal operation of the gas separation apparatus 1F, the adsorbing device 10 behaves in a similar manner to the first embodiment. That is, a first adsorbing-desorbing step and a second adsorbing-desorbing step are alternately performed. During the normal operation, the pressure-flow rate control on-off valve 69 is closed.

In parallel to the alternate execution of the first adsorbing-desorbing step and the second adsorbing-desorbing step, the gas separation apparatus 1F monitors a $CO_2$ concentration in the raw material gas g0 by a concentration sensor 35E. When a concentration measured by the concentration sensor 35E is below a threshold, the pressure-flow rate control on-off valve 69 is opened, and a step for returning the off-gas g5 is executed. Thereby, the off-gas g5 in the buffer tank 68, which is the $CO_2$-rich permeated gas after the reformulation is flown into a joining portion with the raw material gas path 2a as the return gas g5b. And a flow rate of the return gas g5b is controlled by the pressure-flow rate control on-off valve 69 so as not to be returned more than necessary.

The return gas g5b joins the raw material gas g0 in the raw material gas path 2a and is returned to a first adsorption vessel 11 in the adsorbing step. Therefore, the concentration of $CO_2$ in the first adsorption vessel 11 can be increased. By having an adsorbent 13 in the first adsorption vessel 11 adsorb $CO_2$ in the return gas g5b, the CO in the raw material gas g0 can be prevented from being adsorbed by the adsorbent 13. When CO is adsorbed by the adsorbent 13 in the first adsorption vessel 11, the CO can be substituted with $CO_2$.

As a result, a recovery rate of CO (recovery object gas component) can be enhanced. Since the return gas g5b hardly contains the priority removal object gas component such as BTEX, a return flow rate by the returning device 40 can be constrained and a generation efficiency of the product gas g3 can be enhanced. Moreover, by using the off-gas g5 having $H_2S$ and $H_2O$ removed as appropriate as the return gas g5b, an adsorption ability of the adsorbing device 10 can be prevented from being diminished.

The tables 1 to 3 given below show simulated compositions or the like of gases at different parts of the gas separation apparatus 1F for assumed three patterns of composition or the like of the raw material gas g0.

Table 1 lists simulated compositions in a <normal mode> in which the composition of the raw material gas g0 is normal.

Table 2 lists simulated compositions in a <comparative mode> in which the returning step was not performed when the concentration of $CO_2$ in the raw material gas g0 is reduced.

Table 3 lists simulated compositions in an <example mode> in which the returning step was performed when the concentration of $CO_2$ in the raw material gas g0 is reduced.

CO content (4 mol) in the desorbed gas g2 in the example mode (Table 3) was smaller than CO content (9 mol) in the desorbed gas g2 in the comparative mode (Table 2). This provides a confirmation that an amount of CO exhausted out of the system can be reduced by performing the returning step of the sixth embodiment, accordingly the recovery rate of the CO can be enhanced, and thereby a generated amount of ethanol can be increased.

TABLE 1

<Normal Mode>

| Gas | g0 | g4 | g3 | g5 | g5b | g2 | Unit:mol Purifying Part 63 |
|---|---|---|---|---|---|---|---|
| CO    | 30     | 30  | 27 | 3      | 1      | 3   |     |
| H2    | 30     | 30  | 30 | 9      | 12     | 0   |     |
| CO2   | 31     | 31  | 4  | 16     | 16     | 27  |     |
| N2    | 10     | 10  | 10 | 19     | 9      | 0   |     |
| BTEX  | 1.E−03 | 0.0 | 0  | 1.E−01 | 0.E+00 | 0.0 |     |
| C2H6O |        |     |    |        |        |     | 7.6 |

TABLE 2

<Comparative Mode>

| Gas | g0 | g4 | g3 | g5 | g5b | g2 | Unit:mol Purifying Part 63 |
|---|---|---|---|---|---|---|---|
| CO    | 30 | 30  | 21 | 2      | 1      | 9   |     |
| H2    | 40 | 40  | 40 | 12     | 12     | 0   |     |
| CO2   | 22 | 22  | 1  | 16     | 16     | 21  |     |
| N2    | 10 | 10  | 10 | 13     | 9      | 0   |     |
| BTEX  | 0  | 0.0 | 0  | 1.E−01 | 0.E+00 | 0.0 |     |
| C2H6O |    |     |    |        |        |     | 7.8 |

TABLE 3

<Example Mode>

| Gas | g0 | g4 | g3 | g5 | g5b | g2 | Unit:mol Purifying Part 63 |
|---|---|---|---|---|---|---|---|
| CO    | 30 | 31  | 28 | 3      | 1      | 4   |     |
| H2    | 40 | 47  | 47 | 14     | 12     | 0   |     |
| CO2   | 22 | 30  | 4  | 16     | 16     | 26  |     |
| N2    | 10 | 21  | 15 | 21     | 9      | 0   |     |
| BTEX  | 0  | 0.1 | 0  | 1.E−01 | 0.E+00 | 0.0 |     |
| C2H6O |    |     |    |        |        |     | 9.7 |

Note that in the sixth embodiment (FIG. 16), a switching device 31 and the returning device 40 may be omitted. A returning mode for returning the return gas g4 in accordance with the operation cycle of the adsorbing device 10 may be omitted. A concentration of $C_6H_6$ (or another BTEX) or the like in place of $CO_2$ may be monitored by the concentration sensor 35E.

Seventh Embodiment

Figure 17:
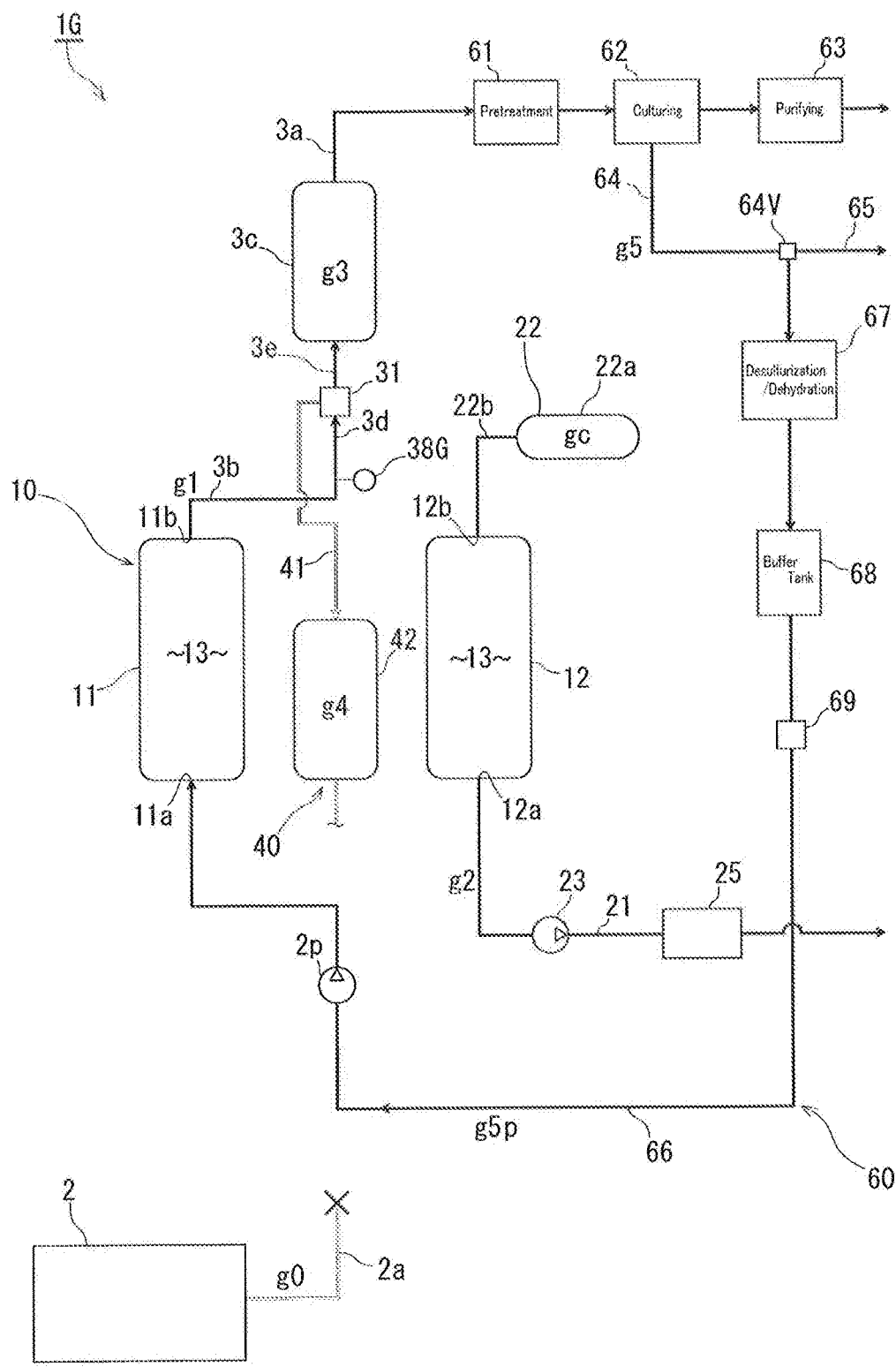
FIG. 17 is a circuit diagram of a gas separation apparatus according to a seventh embodiment of the present invention in a forwarding mode, showing a first adsorption tank in a first purging step and a second adsorption tank in a second desorbing step.
Figure 18:
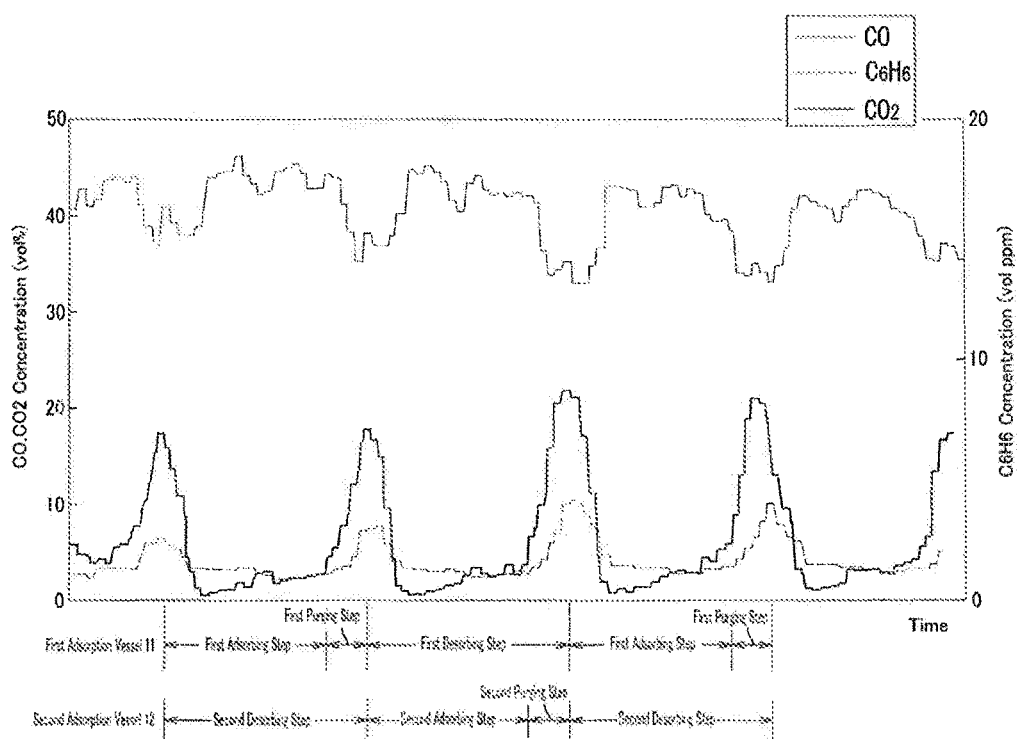
FIG. 18 shows graphs representing changes in concentration of gas components in a permeated gas in the gas separation apparatus according to the seventh embodiment.

FIGS. 17 and 18 show a seventh embodiment of the present invention.

As shown in FIG. 17, a gas separation apparatus 1G according to the seventh embodiment includes a switching device 31 and a returning device 40.

A permeated gas path 3d is provided with a concentration sensor 38G (concentration meter). In the seventh embodiment, as with the second embodiment (FIG. 7), selection is made between a forwarding mode and a returning mode according to results of measurement by the concentration sensor 38G. In normal times, the forwarding mode is selected in which the permeated gas path 3d and a forwarding path 3e are made communicable and a returning path 41 is shut off by the switching device 31.

A culture vessel 62 is connected to a product gas path 3a via an additional pretreatment part 61. Valuable materials such as ethanol ($C_2H_6O$) are generated in the culture vessel 62 and the ethanol is purified in a purifying part 63. An off-gas g5 (permeated gas g1 after reformulation) from the culture vessel 62 is rich in $CO_2$. An off-gas path 64 extends from the culture vessel 62. The off-gas path 64 is bifurcated into a vent path 65 and a returning path 66 via a directional control valve 64V. An off-gas treatment part 67, a buffer tank 68 and a pressure-flow rate control on-off valve 69 are disposed on the returning path 66. The returning path 66 extends to an adsorbing device 10.

A line from the additional pretreatment part 61 and the culture vessel 62 (reformulating device) to a downstream end of the returning path 66 constitutes a purging system 60.

As shown in FIG. 18, a basic behavior of the gas separation apparatus 1G is generally the same as those of the foregoing embodiments. A period in which a first adsorbing step is performed in a first adsorption vessel 11 and a second desorbing step is performed in a second adsorption vessel 12 and a period in which a second adsorbing step is performed in the second adsorption vessel 12 and a first desorbing step is performed in the first adsorption vessel 11 are alternately repeated.

The behavior of the gas separation apparatus 1G of the seventh embodiment is significantly different from those of the foregoing embodiments in that a purging step is performed at the time of switching from the adsorbing step to the desorbing step in the first and second adsorption vessels 11, 12. That is, in the first adsorption vessel 11, a first purging step is performed when proceeding from the first adsorbing step to the first desorbing step. In the second adsorption vessel 12, a second purging step is performed when proceeding from the second adsorbing step to the second desorbing step.

Specifically, as shown in FIG. 17, in the first purging step, the valve 69 is opened and the off-gas g5 rich in $CO_2$ from the buffer tank 68 is introduced into the first adsorption vessel 11 as a purge gas g5p (return gas) through the returning path 66. Preferably, the purge gas g5p is introduced into the first adsorption vessel 11 via a First port 11a.

Supply of a raw material gas g0 is stopped. Therefore, only the purge gas g5p rich in $CO_2$ is introduced to the first port 11a. While $CO_2$ is one of removal object gas components, $CO_2$ is not given a high priority for removal compared with BTEX (priority removal object gas component) such as $C_6H_6$ that should be removed to a concentration in the order of ppm, and may be used as a main component of the purge gas g5p.

As shown in FIG. 18, timing for switching from the first adsorbing step to the first purging step may be preferably set at a time when the concentration of $CO_2$ in the permeated gas g1 from the first adsorption vessel 11 has started to rise, but the concentration of $C_6H_6$ has not yet started to rise.

By the introduction of the purge gas g5p, the gas in the first adsorption vessel 11 is pushed out to a second port 11b and becomes the permeated gas g1. The permeated gas g1 hardly contains the BTEX (priority removal object gas component) such as $C_6H_6$, and may be used as a product gas g3.

Since the purge gas g5p is rich in $CO_2$, it can prevent CO from being absorbed by an adsorbent 13 in the first adsorption vessel 11. When CO is adsorbed by the adsorbent 13 in the first adsorption vessel 11, the CO can be substituted with the $CO_2$. The CO liberated by the substitution is pushed out from the second port 11b and becomes a component of the permeated gas g1, and further becomes a component of the product gas g3. Thereby, a recovery rate can be enhanced.

Preferably, a total amount of supply of the purge gas g5$p$ in one purging step is slightly greater than a volume of void inside the adsorption vessel 11. Thereby, an entirety of the adsorption vessel 11 can be surely purged, thereby enhancing the recovery rate. Moreover, the purge gas g5$p$ rich in $CO_2$ can be prevented from being sent straight to the culture vessel 62 as the product gas g3.

In the gas separation apparatus 1G, a concentration of $C_6H_6$ in the permeated gas g1 is measured by the concentration sensor 38G. When the concentration of $C_6H_6$ exceeds a threshold, the operation mode is switched to the returning mode (not shown). Specifically, the permeated gas path 3$d$ and the forwarding path 3$e$ are shut off from each other and the permeated gas path 3$d$ and the returning path 41 are made communicable with each other by the switching device 31. Thereby, an amount of the BTEX (priority removal object gas component) such as $C_6H_6$ that exceeds the threshold can be prevented from being sent to the culture vessel 62, Particularly, in the purging step, the BTEX can be prevented from being sent to the culture vessel 62.

As shown in FIG. 18, in the first adsorption vessel 11, the valve 69 is closed after the first purging step and the operation proceeds to the first desorbing step. Though not shown in the drawings, in the first desorbing step performed in the first adsorption vessel 11, a carrier gas gc is supplied to the first adsorption vessel 11, where the desorption is performed. Since CO hardly exists in the first adsorption vessel 11 after the first purging step, the amount of CO released from the first adsorption vessel 11 out of the system can be generally nulled.

Synchronously with the start of the first desorbing step, the second adsorbing step is performed in the second adsorption vessel 12. At the end of the second adsorbing step, the second purging step is performed. In the second purging step, the off-gas g5 rich in $CO_2$ from the buffer tank 68 is introduced into the second adsorption vessel 12 as the purge gas g5$p$. Preferably, the purge gas g5$p$ is introduced into the second adsorption vessel 12 via a first port 12$a$.

The gas inside the second adsorption vessel 12 can be purged by the purge gas g5$p$. When CO is adsorbed by an adsorbent 13 in the second adsorption vessel 12, the CO can be substituted with the $CO_2$, and the CO can be liberated.

After that, the second purging step in the second adsorption vessel 12 is ended and the operation is switched to the second desorbing step.

Since CO hardly exists in the second adsorption vessel 12 after the second purging step, in the second desorbing step that follows, the amount of CO released from the second adsorption vessel 12 out of the system can be generally nulled.

As a result, the amount of CO released out of the system is generally zero throughout an entire operation period of the gas separation apparatus 1G. Accordingly, the recovery rate of CO (recovery object component) can be sufficiently enhanced. Theoretically, it is possible to bring the recovery rate of CO to 100%.

While in FIG. 18, switching from the first purging step to the first desorbing step in the first adsorption vessel 11 and the switching from the second desorbing step to the second adsorbing step in the second adsorption vessel 12 are performed simultaneously, it is not required to perform the switchings simultaneously. The timings for the switching may be set before or after each other. The same applies to a relationship between the timings for the switching from the second purging step to the second desorbing step in the second adsorption vessel 12 and the switching from the first desorbing step to the first adsorbing step in the first adsorbing vessel 11. It is not required to perform the switchings simultaneously. The timings for the switching may be set before or after each other.

Eighth Embodiment

Figure 19:
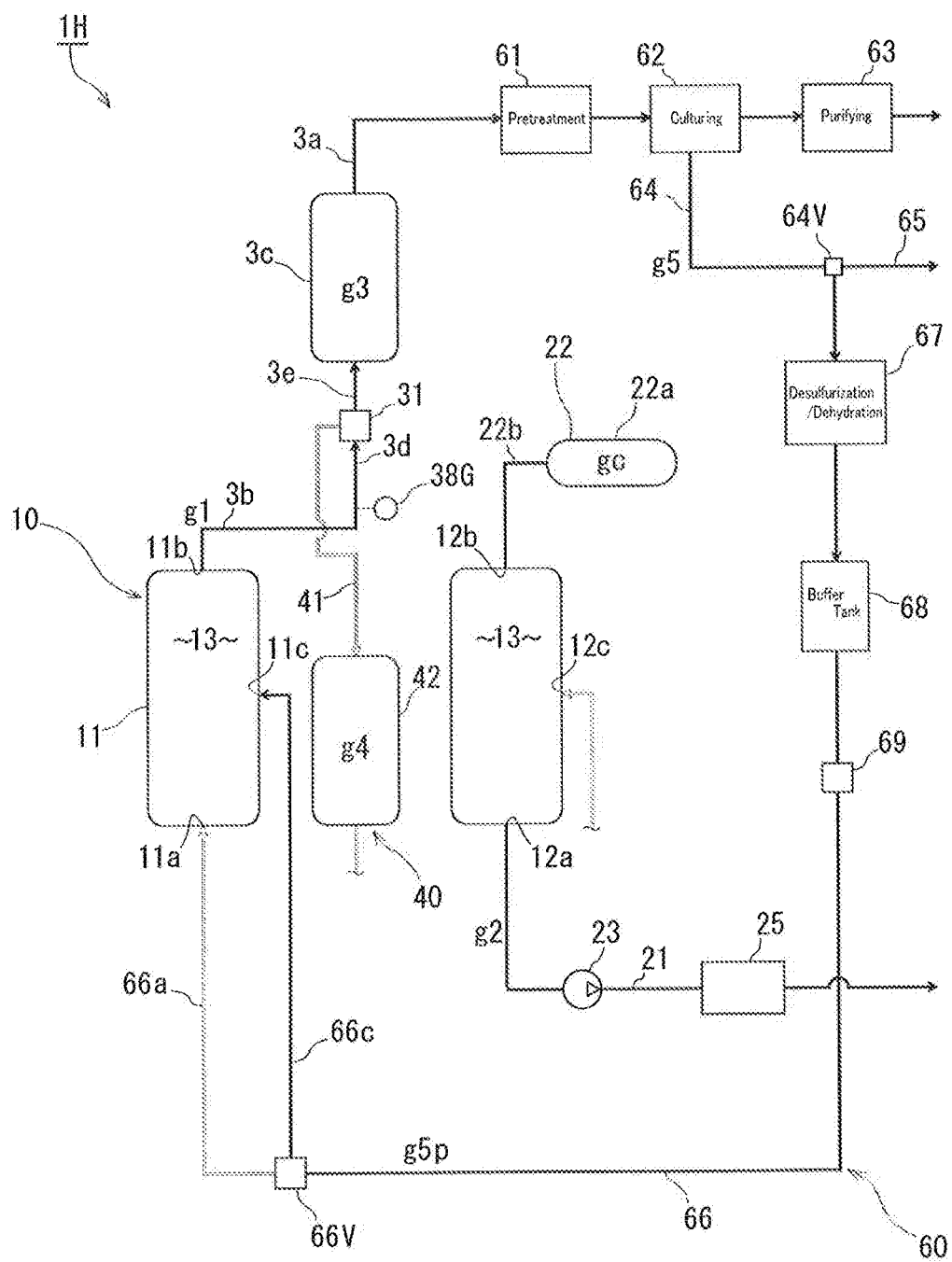
FIG. 19 is a circuit diagram of a gas separation apparatus according to an eighth embodiment of the present invention in a forwarding mode, showing a first adsorption tank in a later period of a first purging step and a second adsorption tank in a second desorbing step.

FIG. 19 shows an eighth embodiment of the present invention. The eighth embodiment is a modification of the seventh embodiment (FIGS. 17 and 18).

In a gas separation apparatus 1H of the eighth embodiment, ports 11$c$, 12$c$ are disposed in respective middle portions of adsorption vessels 11, 12 of am adsorbing device 10. A returning path 66 of a purging system 60 is connectable to the ports 11$c$, 12$c$. The returning path 66 is bifurcated into a lower end returning path 66$a$ and an intermediate returning path 66$c$ via a directional control valve 66V.

In an earlier period (not shown in the drawings) of a first purging step for the first adsorption vessel 11, the lower end returning path 66$a$ is connected to a port 11$a$ at a lower end of the first adsorption vessel 11. The intermediate returning path 66$c$ is closed. Thereby, a purge gas g5$p$ rich in $CO_2$ is introduced into the first adsorption vessel 11 from the port 11$a$ at the lower end. Gas mainly in a lower side portion of the first adsorption vessel 11 can be purged by the purge gas g5$p$. When CO is adsorbed by an adsorbent 13 in the lower side portion of the first adsorption vessel 11, the CO can be substituted with the $CO_2$, and the CO can be liberated. The liberated CO is moved to an upper side portion of the first adsorption vessel 11 by the purging.

As shown in FIG. 19, in a later period of the first purging step, the intermediate returning path 66$c$ is connected to the port 11$c$ in the middle portion of the first adsorption vessel 11. The lower end returning path 66$a$ is closed. Thereby, the purge gas g5$p$ rich in $CO_2$ is introduced into the first adsorption vessel 11 from the port 11$c$ in the middle portion and flows inside the first adsorption vessel 11 toward a port 11$b$ at an upper end. Gas in the upper side portion of the first adsorption vessel 11 can be purged by the purge gas g5$p$. Therefore, BTEX adsorbed in the lower side portion of the first adsorption vessel 11 can be prevented from being purged and mixed with a permeated gas g1. An adsorbent 13 in the upper side portion of the first adsorption vessel 11 adsorbs smaller amount of BTEX compared with the adsorbent 13 in the lower side portion. Therefore, BTEX can be further prevented from being mixed with the permeated gas g1. As a result, a forwarding mode can be surely performed during the first purging step.

Similarly, also in a second purging step for the second adsorption vessel 12, the lower end returning path 66$a$ is connected to the lower end port 12$a$ in an earlier period and the intermediate returning path 66$c$ is connected to the middle port 12$c$ in a later period.

Ninth Embodiment

Figure 20:
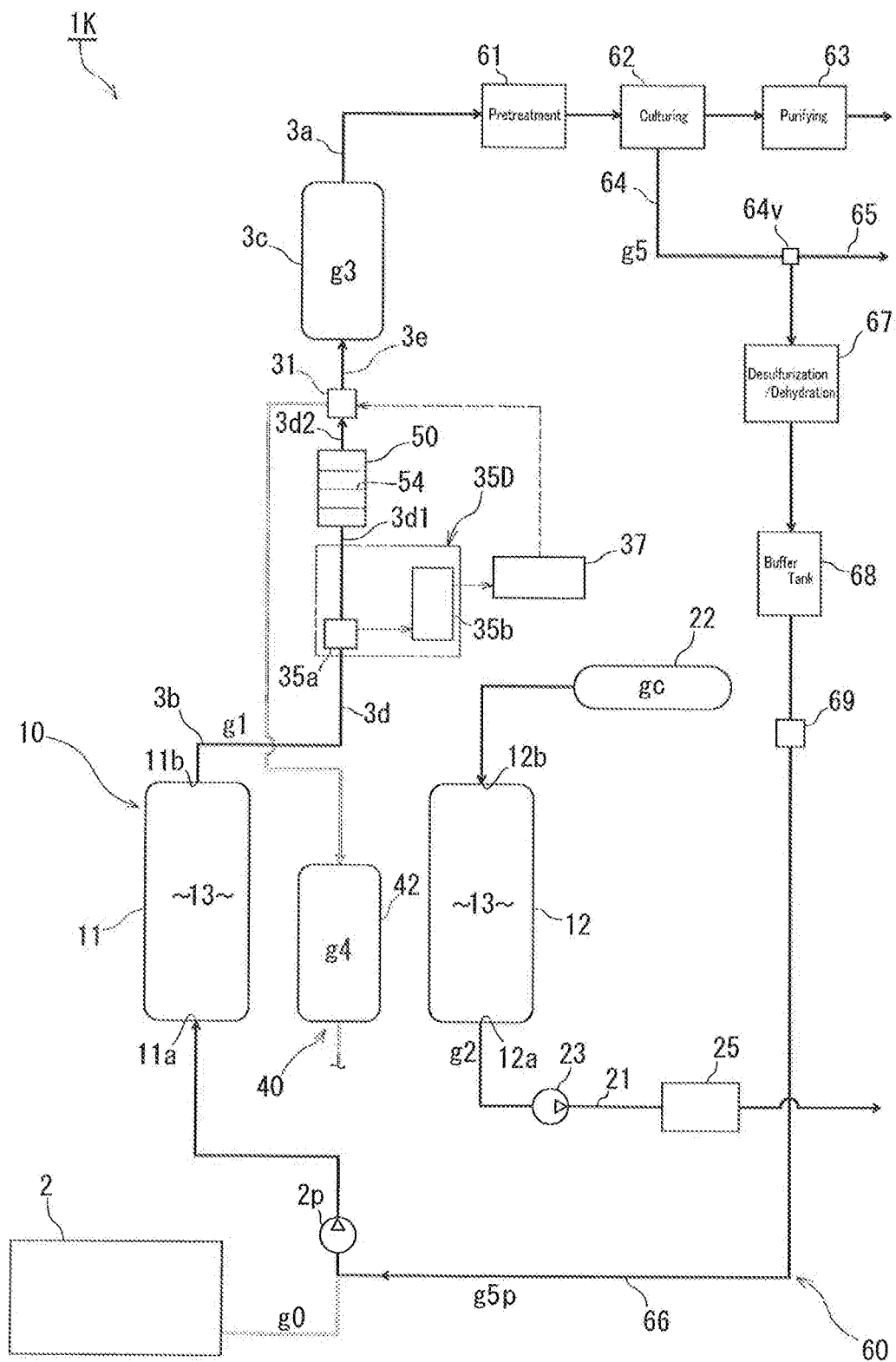
FIG. 20 is a circuit diagram of a gas separation apparatus according to a ninth embodiment of the present invention in a forwarding mode, showing a first adsorption tank in a first purging step and a second adsorption tank in a second desorbing step.

FIG. 20 shows a ninth embodiment of the present invention. The ninth embodiment is a modified embodiment in which the delay means 50 of the fourth embodiment (FIGS. 9 to 12) is incorporated in the seventh embodiment (FIGS. 17 and 18). In a gas separation apparatus 1K, a concentration meter 35D, a delay device 50 and a switching device 31 are disposed on a permeated gas path 3$d$. $C_6H_6$ (priority removal object component) in a permeated gas g1 is measured by the concentration meter 35D. A controller 37 controls switching operation of the switching device 31 based on results of the measurement.

The permeated gas g1 flows in a delay path 51 of the delay device 50 taking a delay time $t_D$ corresponding to a processing time $t_S$ from the measurement to the switching operation.

Thereby, during the purging step or the like, a forwarding mode can be surely performed for the permeated gas g1 that contains BTEX in a concentration below a threshold, and a returning mode can be surely performed for the permeated gas g1 that contains BTEX in a concentration exceeding the threshold. As a result, the priority removal object gas component such as $C_6H_6$ can be sufficiently prevented from being mixed with a product gas g3.

Figure 21:
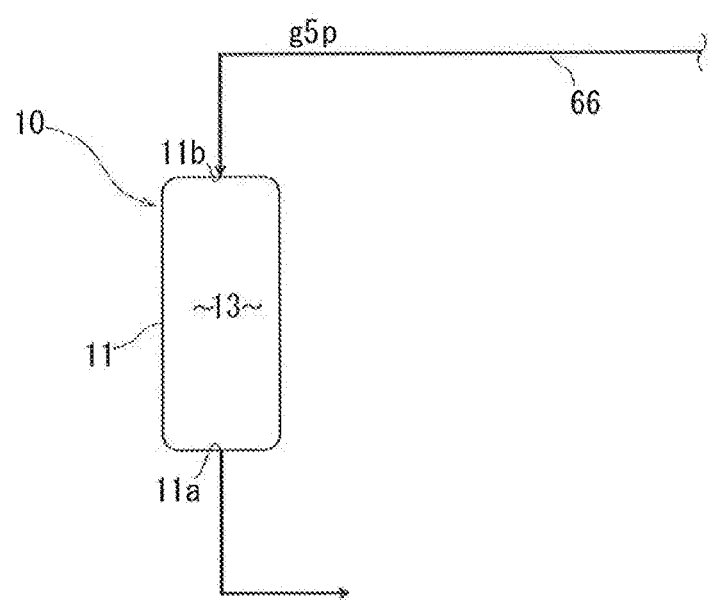
FIG. 21 is a circuit diagram showing a modified embodiment in which a flow direction of a purge gas in an adsorption tank is modified.

While the flow directions of the purge gas gyp in the adsorption vessels 11, 12 in the purging step in the seventh to the ninth embodiments are the same as the direction of the gas flow in the adsorbing step, the flow direction in the purging step may be opposite to the gas flow in the adsorbing step as shown in FIG. 21.

The present invention is not limited to the embodiments described above. Various modifications can be made without departing from the scope and spirit of the invention.

For example, the adsorbing device 10 may include not less than three adsorption vessels 11, 12. The adsorbing device 10 may include only one adsorption vessel.

The adsorbing device 10 may selectively adsorb the recovery object gas components in the raw material gas g0 and allow the removal object gas components to permeate (the method (2)). The desorbed gas g2 may be provided as the product gas g3 or the return gas g4. The switching device 31 may select between the forwarding mode in which the desorbed gas g2 is provided as the product gas g3 and the returning mode in which the desorbed gas g2 is provided as the return gas g4. The desorbed gas g2 that was provided as the return gas g4 may be accumulated in the buffer tank 42.

The present invention may be applied to a system in which $CO_2$, $C_6H_6$ or the like in the desorbed gas g2 is used as the product gas. In a case where $O_2$, for example, is contained in the desorbed gas g2 besides the target gas component ($CO_2$, $C_6H_6$) as the removal object components, when the $O_2$ concentration in the desorbed gas g2 is low, the forwarding mode may be selected in which the desorbed gas g2 is provided as the product gas (forward gas) and when the $O_2$ concentration in the desorbed gas g2 is relatively high, the returning mode may be selected in which the desorbed gas g2 is provided as the return gas.

The returning path 41 may be directly connected to the adsorbing device 10 not via the raw material gas path 2a. The return gas g4 may be directly introduced into the adsorbing device 10 and the raw material gas g0 and the return gas g4 may be joined in the adsorbing device 10.

The buffer tank 42 may be omitted. The return gas g4 may be directly joined with the raw material gas g0 not via the buffer tank 42.

The measurement object gas components measured by the concentration sensor 35 are not limited to the removal object gas components. The recovery object gas components may be measured.

By monitoring the raw material gas g0, the modes may be selected or the execution of the returning step may be determined according to concentrations of specific components such as $CO_2$ in the raw material gas g0.

By monitoring the permeated gas g1, the modes may be selected or the execution of the returning step may be determined according to concentrations of specific components such as the BTEX or $CO_2$ in the permeated gas g1.

By monitoring the desorbed gas g2, the modes may be selected or the execution of the returning step may be determined according to concentrations of specific components such as the BTEX or $CO_2$ in the desorbed gas g2.

The modes may be selected or the execution of the returning step may be determined according to conditions of the permeated gas or the desorbed gas before the reformulation. The modes may be selected or the execution of the returning step may be determined according to conditions of the permeated gas or the desorbed gas after the reformulation.

The reformulating device is not limited to the culture vessel 62. A catalytic reactor or an activated carbon or the like may be used as the reformulating device. In the catalytic reactor, the permeated gas is subjected to a catalytic reaction to synthesize organic substances. A metallic catalyst such as rhodium, manganese, lithium and magnesium, for example, may be used as a catalyst in the catalytic reactor.

INDUSTRIAL APPLICABILITY

The present invention may be applied to a system for purifying a syngas generated in an incineration disposal of industrial wastes, for example.

EXPLANATION OF REFERENCE NUMERALS g0 raw material gas
g1 permeated gas
g2 desorbed gas
g2b return gas
g3 product gas (forward gas)
g4 return gas
g5 off-gas
g5b return gas
g5p purge gas (return gas)
gc carrier gas
$t_{FM}$ first predetermined period of time
$t_{RM}$ second predetermined period of time
$FM_1$, $FM_2$ forwarding mode
$RM_1$, $RM_2$ returning mode
1 gas separation apparatus
1B, 1C, 1E, 1F, 1G, 1H, 1K gas separation apparatus
2 raw material gas supplier
2a raw material gas path
3a product gas path
3b, 3d permeated gas path
3e forwarding path
3c buffer tank
10 adsorbing device
11 first adsorption vessel
12 second adsorption vessel
21 desorbed gas path
22 carrier gas source (desorbing device)
23 suctioning device (desorbing device)
24 switching device (selector)
26 returning path
31 switching device (selector)
35 concentration sensor (concentration meter)
35D concentration meter
35a collecting portion
35b composition analyzing portion
37 controller (selector)
40 returning device
41 returning path
42 buffer tank (return gas accumulator)
46 water vapor reformulating device (reformulating device)
50 delay means
51 delay path

60 purging system
62 culture vessel (reformulating device)
64 off-gas path
66 returning path (returning device)
68 buffer tank (return gas accumulator)
69 on-off valve (returning device, selector)

The invention claimed is:

1. A method for separating gas by pressure swing adsorption, the method comprising:
  a step of adsorbing, wherein a raw material gas containing a removal object gas component and a recovery object gas component is fed to an adsorbing device and a permeated gas is sent out from the adsorbing device;
  a step of desorbing, wherein a pressure of the adsorbing device is made lower than the pressure in the adsorbing step and a desorbed gas is sent out from the adsorbing device;
  a step of returning, wherein one of the permeated gas and the desorbed gas is provided as a return gas to the adsorbing device according to a condition of the raw material gas, one of the permeated gas and the desorbed gas having a lower concentration or a lower partial pressure of a priority removal object gas component than the raw material gas, the priority removal object gas component being a gas component to be preferentially removed among the removal object gas component;
  a reformulating step, the permeated gas which is to be the return gas being reformulated in the reformulating step before the returning step, wherein the reformulating step includes a microbial fermentation step, the permeated gas being reformulated by microbial fermentation in the microbial fermentation step; and
  a measuring step measuring a concentration or a partial pressure of a measurement object gas component of the raw material gas,
  wherein the permeated gas reformulated by the microbial fermentation is returned to the adsorbing device when the concentration or the partial pressure of the measurement object gas component is below a threshold,
  wherein the measurement object gas component is a low adsorptive removal object gas component, of the removal object gas component, the low adsorptive removal object gas component having lower adsorptive property by the adsorbing device than the priority removal object gas component.

2. The method for separating gas according to claim 1, further comprising an accumulating step, the return gas being accumulated in a return gas accumulator in the accumulating step.

3. The method for separating gas according to claim 1, wherein gas after the reformulation has a higher concentration or a higher partial pressure of $CO_2$ than gas before the reformulation.

4. The method for separating gas according to claim 1, further comprising a purging step, wherein the return gas is fed to the adsorbing device as a purge gas and a gas is pushed out of the adsorbing device in accordance with the operating cycle of the adsorbing device.

5. The method for separating gas according to claim 4, wherein the purge gas is a gas obtained by reformulating the permeated gas or the desorbed gas.

6. The method for separating gas according to claim 4, wherein the purge gas is a gas that has a lower concentration or a lower partial pressure of the priority removal object gas component than the raw material gas by reformulating one of the desorbed gas and the permeated gas that has a higher concentration or a higher partial pressure of the priority removal object gas component than the raw material gas.

7. The method for separating gas according to claim 6, wherein the purge gas is a gas that has the lower concentration or the lower partial pressure of the priority removal object gas component than the raw material gas by making a gas that has a higher concentration or a higher partial pressure of the priority removal object gas component than the raw material gas contacted with an activated carbon.

8. The method for separating gas according to claim 4, wherein the purge gas is the permeated gas or the desorbed gas after at least one of processing steps of desulfurization and dehydration.

9. The method for separating gas according to claim 4, wherein a flow direction of the purge gas in the adsorbing device is same as a direction of a gas flow in the adsorbing step.

10. The method for separating gas according to claim 4, wherein a flow direction of the purge gas in the adsorbing device is opposite to a direction of a gas flow in the adsorbing step.

11. The method for separating gas according to claim 4, wherein the purge gas is introduced to the adsorbing device from a middle portion of the adsorbing device.

12. The method for separating gas according to claim 4, wherein a selection is made whether to provide the pushed-out gas as the return gas or not according to a concentration or a partial pressure of the priority removal object component in the pushed-out gas.

13. The method for separating gas according to claim 12, wherein the concentration or the partial pressure of the priority removal object component in the pushed-out gas or an indicator correlated to the concentration or the partial pressure is measured and based on the result of the measurement, a selection is made whether to provide the pushed-out gas as the return gas or not, and
  the pushed-out gas after the measurement is passed through a delay path, the gas passing through the delay path taking a delay time according to a processing time from a start of the measurement to the selection, and
  the gas from the delay path is provided as a returnable gas to be the return gas.

14. The method for separating gas according to claim 1, wherein the priority removal object gas component includes benzene, toluene, ethyl benzene or xylene or a compound of nitrogen or a compound of sulfur.

15. A gas separation apparatus by pressure swing adsorption, the apparatus comprising:
  an adsorbing device selectively adsorbing a removal object gas component or a recovery object gas component from a raw material gas and sending out a permeated gas;
  a desorbing device making a desorbed gas containing the adsorbed object gas component sent out from the adsorbing device by making a pressure of the adsorbing device lower than during the adsorbing;
  a returning device providing one of the permeated gas and the desorbed gas as a return gas to the adsorbing device according to a condition of the raw material gas, one of the permeated gas and the desorbed gas having a lower concentration or a lower partial pressure of a priority removal object gas component than the raw material gas, the priority removal object gas component being a gas component to be preferentially removed among the removal object gas component;
  a reformulating device reformulating the permeated gas which is to be the return gas before the execution of the returning, wherein the reformulating device includes a culture vessel for microorganisms performing fermentation with the permeated gas; and a measuring instrument measuring a concentration or a partial pressure of a measurement object gas component of the raw material gas;

wherein the returning device is connected to the culture vessel and returns the permeated gas reformulated by the microbial fermentation to the adsorbing device when the concentration or the partial pressure of the measurement object gas component is below a threshold, wherein the measurement object gas component is a low adsorptive removal object gas component of the removal object gas component, the low adsorptive removal object gas component having lower adsorptive property by the adsorbing device than the priority removal object gas component.

16. The gas separation apparatus according to claim 15, wherein the returning device includes a return gas accumulator, the return gas being accumulated in the return gas accumulator.

17. The gas separation apparatus according to claim 15, wherein gas after the reformulation has a higher concentration or a higher partial pressure of $CO_2$ than gas before the reformulation.

18. The gas separation apparatus according to claim 15, further comprising a purging system pushing a gas out of the adsorbing device by feeding the return gas to the adsorbing device as a purge gas in accordance with the operating cycle of the adsorbing device.

19. The gas separation apparatus according to claim 15, wherein the priority removal object gas component includes benzene, toluene, ethyl benzene or xylene or a compound of nitrogen or a compound of sulfur.

* * * * *